United States Patent
Vincent et al.

(10) Patent No.: US 7,646,921 B2
(45) Date of Patent: Jan. 12, 2010

(54) HIGH RESOLUTION REPLICATION OF DOCUMENT BASED ON SHAPE CLUSTERING

(75) Inventors: Luc Vincent, Palo Alto, CA (US); Raymond W. Smith, Mountain View, CA (US)

(73) Assignee: Google Inc., Mountain View, CA (US)

( * ) Notice: Subject to any disclaimer, the term of this patent is extended or adjusted under 35 U.S.C. 154(b) by 716 days.

(21) Appl. No.: 11/519,320

(22) Filed: Sep. 11, 2006

(65) Prior Publication Data

US 2008/0063277 A1  Mar. 13, 2008

(51) Int. Cl.
G06K 9/62 (2006.01)
G06K 9/20 (2006.01)

(52) U.S. Cl. ..................... 382/225; 382/321

(58) Field of Classification Search .............. 382/173, 382/175–182, 224, 225, 229, 298, 321
See application file for complete search history.

(56) References Cited

U.S. PATENT DOCUMENTS

| | | |
|---|---|---|
| 4,769,716 A | 9/1988 | Casey et al. |
| 5,379,349 A | 1/1995 | Avi-Itzhak |
| 5,465,309 A | 11/1995 | Johnson |
| 5,956,419 A | 9/1999 | Kopec et al. |
| 5,970,170 A | 10/1999 | Kadashevich et al. |
| 6,069,978 A | 5/2000 | Peairs |
| 6,640,010 B2 | 10/2003 | Seeger et al. |
| 6,741,745 B2 | 5/2004 | Dance et al. |
| 6,751,351 B2 | 6/2004 | Knowles et al. |
| 7,519,221 B1 | 4/2009 | Nicholson |
| 2002/0006220 A1 | 1/2002 | Kohchi |
| 2004/0202349 A1 | 10/2004 | Erol et al. |
| 2005/0018906 A1 | 1/2005 | Napper |
| 2005/0069173 A1 | 3/2005 | Morisada et al. |
| 2008/0063276 A1 | 3/2008 | Vincent et al. |
| 2008/0063278 A1 | 3/2008 | Vincent et al. |
| 2008/0063279 A1 | 3/2008 | Vincent et al. |

OTHER PUBLICATIONS

Krishnamachari, et al. "Image Browsing Using Hierarchical Clustering", IEEE, pp. 301-307, 1999.*
Bern, M. And D. Goldberg, "Scanner-Model-Based document image improvement," Proceedings of the 2000 International Conference on Image Processing, Vancouver, BC, Canada, Sep. 10-13, 2000, vol. 2, pp. 582-585.
Lin, Xiaofan, *Reliable OCR solution for digital content re-mastering*; Jan. 2002; SPIE Conference on Document recognition and Retrieval IX, San Jose, CA, 10 pages.
Suzuki, M. et al, "INFTY—An integrated OCR system for mathematical documents," Proceedings of the 2003 ACM symposium on Document Engineering, Grenoble, France, pp. 95-104 (2003).
Huttenlocher, Daniel et al., "Digipaper: a versatile color document image representation," Dept. Of Computer Science, Cornell University, Ithaca, NY and Xerox Palo Alto Research Center, Palo Alto, CA, 5 pages, which was published at the *Proceedings of the 1999 International Conference on Image Processing*, Oct. 24, 1999-Oct. 28, 1999, Kobe, Japan, pp. 219-223 (1999).

* cited by examiner

Primary Examiner—Daniel G Mariam
(74) Attorney, Agent, or Firm—Fish & Richardson P.C.

(57) ABSTRACT

Techniques for shape clustering and applications in processing various documents, including an output of an optical character recognition (OCR) process.

29 Claims, 19 Drawing Sheets

HIGH RESOLUTION REPLICATION OF DOCUMENT BASED ON SHAPE CLUSTERING

BACKGROUND

This specification relates to shape clustering and optical character recognition.

Optical character recognition (OCR) uses computer software, which will be referred to generically as an OCR engine, to process digital images of printed, typewritten, handwritten, or other written text, whether originally on paper, microfilm, or other medium, and to produce machine recognizable and editable text from the images. The digital image of a document processed by an OCR engine may include images of multiple pages of written material. The images of the text to be processed by the OCR engine may be obtained by various imaging methods including using an image scanner to capture digital images of the text.

An OCR engine generally produces rectangular bounding boxes intended to enclose collectively the text written on each page. Generally, when the document image has gray scale or color information, the OCR engine binarizes the image so that each image pixel is determined to be either a foreground pixel (e.g., black text) or a background pixel (e.g., a white region). Each bounding box normally encloses one or more connected groups of text pixels of one character perceived by the OCR engine, but may also overlap part of, or in extreme cases all of, an adjacent character. In such situations, several methods exist to separate the pixels identified by the OCR engine as belonging to the interior of the bounding box from those that belong to a different but overlapping bounding box. These methods include: generating mask images by thresholding and connected component analysis, constructing outline polygons, and constructing parallelogram bounding boxes. An OCR engine generally assigns to each bounding box one or more OCR character codes. Each OCR code identifies one or more characters that the engine has recognized in the bounding box. If an OCR engine fails to recognize any character in a bounding box, it may assign no OCR character code to the bounding box. Each character identified by an OCR character code can be represented in a standard character encoding, e.g., an ASCII or Unicode encoding.

Each bounding box can be thought of as a clipping path that isolates a portion or small image of the document image, whether in an original form or a binarized binary form. Because these small images can be thought of as being clipped from the document image by their respective bounding boxes, these small images will be referred to as clips or clip images. Because each clip image is tied to a bounding box, the OCR character code or codes, and hence the character or characters, assigned to a bounding box can also be referred to or identified as the codes or the characters assigned to the clip image. Unless otherwise noted, the term clip or clip image will refer to an image that is a portion of a document image and that is processed for character recognition by an OCR engine.

An OCR engine may make errors during the processing. For example, an OCR engine may improperly segment the original image by, e.g., including only a portion of a character in a bounding box or including multiple characters that are recognized as a single character in a single bounding box. As another example, an OCR engine may assign an incorrect OCR character code to a bounding box due to some image similarity between the clip image enclosed by the bounding box and a reference image for a different character code or due to poor image quality of the digital images received by the OCR engine.

SUMMARY

This specification describes, among others, techniques for shape clustering and applications in processing various documents, including an output of an optical character recognition (OCR) process.

In one aspect, a method can include the following: classifying clip images defined in a received OCR output of a document processed by an OCR process into clusters of clip images; processing clip images in each of the clusters to generate a cluster image for each cluster; comparing the cluster images to detect clusters to which one or more OCR character codes were erroneously assigned by the OCR process; assigning one or more new OCR character codes to a first cluster that is detected to have an erroneously assigned one or more OCR character codes in the OCR output; and using the one or more new OCR character codes to replace the erroneously assigned OCR character code at each occurrence of one of the clip images of the first cluster in the OCR output to produce a modified OCR output. Each cluster includes clip images that are assigned the same one or more characters codes by the OCR process.

In another aspect, a system for optical character recognition (OCR) can include an OCR engine and a post-OCR engine. The OCR engine is operable to process an original image of a document to produce an OCR output including clip images extracted from the original image and to assign one or more characters to each clip image. The post-OCR engine is operable to classify clip images the OCR output into clusters of clip images. Each cluster includes clip images that are assigned the same one or more characters codes by the OCR engine. The post-OCR engine is operable to process clip images in each of the clusters to generate a cluster image for each cluster and compare the cluster images to detect clusters to which one or more OCR character codes were erroneously assigned by the OCR engine. The post-OCR engine is further operable to assign one or more new OCR character codes to a first cluster that is detected to have an erroneously assigned one or more OCR character codes in the OCR output, and use the one or more new OCR character codes to replace the erroneously assigned OCR character code at each occurrence of one of the clip images of the first cluster in the OCR output to produce a modified OCR output.

In another aspect, a method for post optical character recognition (OCR) processing can include classifying clip images defined in a received OCR output of a document processed by an optical character recognition (OCR) process into clusters of clip images; processing clip images in each of the clusters to generate a cluster image for each cluster. Each cluster includes clip images that are identical or similar in size and are assigned the same one or more characters codes by the OCR process. For a first cluster assigned one or more first OCR character codes, this method identifies: (1) a second cluster assigned one or more second OCR character codes different from the one or more first OCR character codes, where the cluster image of the second cluster is closer in shape to a cluster image of the first cluster than to cluster images of other clusters assigned one or more OCR characters different from the one or more first OCR character codes, and (2) a third cluster assigned the same one or more first OCR character codes as the first cluster, where the cluster image of the third cluster is closer in shape to the cluster image of the first cluster than to the cluster images of other clusters assigned the one or more first OCR character codes. This method uses at least shape differences between the cluster images of the first cluster and the second cluster and between the cluster images of the first cluster and the third cluster to determine a level of confidence in the one or more first OCR character codes assigned to the first cluster.

In another aspect, a system for optical character recognition (OCR) can include an OCR engine and a post-OCR engine. The OCR engine is operable to process an original image of a document to produce an OCR output including clip images extracted from the original image and to assign one or more characters to each clip image; and a post-OCR engine operable to classify clip images in the OCR output into clusters of clip images. Each cluster includes clip images that are identical or similar in size and are assigned the same one or more characters codes by the OCR engine. The post-OCR engine is operable to process clip images in each of the clusters to generate a cluster image for each cluster. The post-OCR engine is also operable to identify, for a first cluster assigned one or more first OCR character codes, (1) a second cluster assigned one or more second OCR character codes different from the one or more first OCR character codes, where the cluster image of the second cluster is closer in shape to a cluster image of the first cluster than to cluster images of other clusters assigned one or more OCR characters different from the one or more first OCR character codes, and (2) a third cluster assigned the same one or more first OCR character codes as the first cluster, where the cluster image of the third cluster is closer in shape to the cluster image of the first cluster than to the cluster images of other clusters assigned the one or more first OCR character codes. In this system, the post-OCR engine is operable to use at least shape differences between the cluster images of the first cluster and the second cluster and between the cluster images of the first cluster and the third cluster to determine a level of confidence in the one or more first OCR character codes assigned to the first cluster.

In another aspect, a system for optical character recognition (OCR) can include a cluster generation engine and a cluster processing engine. The cluster generation engine is operable to receive an OCR output having separated images produced by an OCR engine in processing an original image of a document and one or more characters assigned to each separated image by the OCR engine. The cluster generation engine is operable to classify the separated images in the OCR output into clusters of separated images that are of a particular image size and are assigned the same one or more OCR character codes by the OCR engine. The cluster processing engine is operable to obtain shape metric distances between a cluster image of a cluster and cluster images of other clusters and to detect whether an error exists in assignment of one or more OCR character codes assigned to each cluster by the OCR engine based on the obtained shape metric distances. The cluster processing engine is further operable to correct one or more erroneously assigned OCR character codes for a cluster.

In another aspect, a method for optical character recognition (OCR) can include receiving an OCR output having separated images produced by an OCR engine in processing an original image of a document and one or more characters assigned to each separated image by the OCR engine, classifying the separated images in the OCR output into clusters of separated images that are of a particular image size and are assigned the same one or more OCR character codes by the OCR engine; obtaining shape metric distances between a cluster image of a cluster and cluster images of other clusters and to detect whether an error exists in assignment of one or more OCR character codes assigned to each cluster by the OCR engine based on the obtained shape metric distances; and correcting one or more erroneously assigned OCR character codes for a cluster.

In another aspect, a method can include classifying clip images defined in a received OCR output, from an optical character recognition (OCR) process that processes an original document image, into clusters of clip images. Each cluster includes clip images of identical or similar image sizes and shapes that are assigned the same one or more particular characters by the OCR process. Gray scale or color information from the original document image is applied in averaging clip images in each cluster to generate an averaged image for each cluster.

In another aspect, a system for optical character recognition (OCR) can include an OCR engine and a post-OCR engine. The OCR engine is operable to process an original image of a document to produce an OCR output having clip images extracted from the original image and to assign one or more characters to each clip image. The post-OCR engine is operable to classify clip images in the OCR output into clusters of clip images. Each cluster includes clip images of identical or similar image sizes and shapes that are assigned the same one or more particular characters by the OCR engine. The post-OCR engine is operable to apply gray scale or color information from the original document image in averaging clip images in each cluster to generate an averaged image for each cluster.

In another aspect, a method for processing output from an optical character recognition (OCR) process can include classifying separated images in an output of the OCR process generated from processing an original image of a document into clusters of separated images; using a cluster image to represent separated images in a respective cluster; selecting a cluster which has a low level of confidence to obtain a manual assignment of one or more characters with the cluster image of the selected cluster; and using the one or more characters obtained by the manual assignment to verify or replace respective one or more particular characters previously assigned by the OCR process in the output of the OCR process. In this method, each cluster includes separated images of similar image sizes and shapes that are assigned the same one or more particular characters by the OCR process.

In another aspect, a system for optical character recognition (OCR) can include an OCR engine and a post-OCR engine. The OCR engine is operable to process an original image of a document to produce separated images extracted from the original image and assign one or more characters to each separated image. The post-OCR engine is operable to classify separated images in the OCR output into clusters of separated images. Each cluster includes separated images of similar image sizes and shapes that are assigned the same one or more particular characters by the OCR engine. The post-OCR engine is operable to generate a cluster image to represent separated images in a respective cluster, select a cluster which has a low level of confidence to obtain a manual assignment of one or more characters with the cluster image of the selected cluster, and use the one or more characters obtained by the manual assignment to verify or replace respective one or more particular characters previously assigned by the OCR engine.

In another aspect, a method can include classifying clip images defined in a received OCR output of a document processed by an optical character recognition (OCR) process into clusters of clip images; generating a cluster image to represent clip images in each cluster; selecting a cluster image of a particular cluster as part of an on-line challenge-response test to solicit a user identification of the cluster image of the particular cluster; and using the user identification received from the on-line challenge-response test to verify or correct one or more particular characters assigned to the particular cluster by the OCR process. In this method, each cluster includes clip images of similar image sizes and shapes that are assigned the same one or more particular characters by the OCR process.

In another aspect, a method can include classifying clip images defined in a received OCR output of a document processed by an optical character recognition (OCR) process into clusters of clip images; using a cluster image to represent clip images in each cluster; using an on-line game to supply a cluster image of a particular cluster to one or more users of the on-line game for a user response as part of the on-line game; and using the user response received from the on-line game to verify or correct one or more particular characters assigned to the particular cluster by the OCR process. In this method, each cluster includes clip images of similar image sizes and shapes that are assigned the same one or more particular characters by the OCR process.

In another aspect, a system for optical character recognition (OCR), can include OCR engines, post-OCR processing engines and a vote processing engine. Each OCR engine is operable to process an original image of a document and to produce a respective OCR output. Each post-OCR processing engines is operable to receive an OCR output from a respective OCR engine and operable to produce a respective modified OCR output of the document. The vote processing engine is operable to select portions from the modified OCR outputs and to assemble the selected portions into a final OCR output for the document. Each post-OCR processing engine is operable to classify clip images defined in a received OCR output for the document into clusters of clip images and each cluster includes clip images of similar image sizes and shapes that are assigned the same one or more particular characters by the corresponding OCR engine. Each post-OCR engine is operable to generate a cluster image to represent clip images in each cluster. The vote processing engine is operable to use shape differences between a cluster image of each cluster and cluster images of other clusters to detect whether an error exists in the one or more particular characters assigned to each cluster by the corresponding OCR engine; correct each detected error in a particular cluster by newly assigning one or more particular characters to the particular cluster; and use the newly assigned one or more particular characters for the particular cluster to replace respective one or more particular characters previously assigned by the corresponding OCR engine in a corresponding modified OCR output.

In another aspect, a method for optical character recognition (OCR) can include using OCR engines to process an original image of a document and to produce OCR outputs, respectively; processing each of the OCR outputs separately from processing other OCR output to produce a respective modified OCR output of the document. the processing including: classifying clip images defined in a received OCR output for the document into clusters of clip images, generating a cluster image to represent clip images in each cluster, using shape differences between a cluster image of each cluster and cluster images of other clusters to detect whether an error exists in the one or more particular characters assigned to each cluster by the corresponding OCR engine. Each cluster includes clip images of similar image sizes and shapes that are assigned the same one or more particular characters by the corresponding OCR engine. This method further includes correcting each detected error in a particular cluster by newly assigning one or more particular characters to the particular cluster, using the newly assigned one or more particular characters for the particular cluster to replace respective one or more particular characters previously assigned by the corresponding OCR engine in a corresponding modified OCR output; and selecting portions from the modified OCR outputs and to assemble the selected portions into a final OCR output for the document.

In another aspect, a method can include processing a document image with a first optical character recognition (OCR) engine to generate first OCR output and processing the document image with a second OCR engine to generate second OCR output. The first OCR output includes first bounding boxes identifying first clip images located in the document image and respective one or more characters assigned to each first clip image. The second OCR output includes second bounding boxes identifying second clip images located in the document image and respective one or more characters assigned to each second clip image. This method further includes applying shape clustering to the first OCR output to produce first clusters with first clip images and a respective confidence score for each assignment of one or more characters to a first clip image; applying shape clustering to the second OCR output to produce second clusters with second clip images and a respective confidence score for each assignment of one or more characters to a second clip image; and generating a final OCR output from the first OCR output and the second OCR output. The final OCR output includes bounding boxes and using the confidence scores for assignments of the one or more characters to the first clip images and the second clip images to select and assign respective one or more characters to each of the bounding boxes.

In another aspect, a system for optical character recognition (OCR) can include a first OCR engine, a first post-OCR engine, a second OCR engine, a second post-OCR engine and a vote processing engine. The first OCR engine is operable to process a document image to generate first OCR output which includes first bounding boxes identifying first clip images located in the document image and respective one or more characters assigned to each first clip image. The first post-OCR engine is operable to apply shape clustering to the first OCR output to produce first clusters with first clip images and a respective confidence score for each assignment of one or more characters to a first clip image. The second OCR engine is operable to process the document image to generate second OCR output which includes second bounding boxes identifying second clip images located in the document image and respective one or more characters assigned to each second clip image. The second post-OCR engine is operable to apply shape clustering to the second OCR output to produce second clusters with second clip images and a respective confidence score for each assignment of one or more characters to a second clip image. The vote processing engine is used to receive and process the first OCR output and the second OCR output and to produce a final OCR output from the first and second clusters in based on confidence scores.

In another aspect, a method can include processing a document image with a first optical character recognition (OCR) engine to generate first OCR output, and processing the document image with a second OCR engine to generate second OCR output. The first OCR output includes first bounding boxes identifying first clip images located in the document image and a respective one or more characters assigned to each first clip image. The second OCR output includes second bounding boxes identifying second clip images located in the document image and a respective one or more characters assigned to each second clip image. This method further includes classifying the first clip images and the second clip images into clusters where each cluster includes only clip images having the same one or more characters assigned to the clip image; generating a cluster image for each cluster; using the cluster images to verify or correct the assignment of characters to clip images and determine a confidence score for each assignment of one or more characters to a clip image; and using the assignments of characters to the cluster images to generate a final OCR output.

In another aspect, a system for optical character recognition (OCR) can include a first OCR engine, a second OCR engine, a post-OCR engine and a vote processing engine. The first OCR engine is operable to process a document image to generate first OCR output. This first OCR output includes first bounding boxes identifying first clip images located in the document image and a respective one or more characters assigned to each first clip image. The second OCR engine is operable to process the document image to generate second OCR output. This second OCR output includes second bounding boxes identifying second clip images located in the document image and a respective one or more characters assigned to each second clip image. The post-OCR engine is used to receive the first and second OCR outputs and to classify the first clip images and the second clip images into clusters. Each cluster includes only clip images having the same one or more characters assigned to the clip image and a cluster image representing clip images for each cluster. The vote processing engine is operable to generate a final OCR output based on assignments of characters to the cluster images from the post-OCR engine.

In another aspect, a method can include processing a document image with a first optical character recognition (OCR) engine to generate first OCR output; applying shape clustering to the first OCR output to produce a first modified OCR output. The first OCR output includes bounding boxes identifying clip images located in the document image and a character assignment assigning one or more characters to each clip image. The first modified OCR output includes a modification of the assignment of characters to clip images and words recognized in the document image. This method further includes identifying a suspect word in the first modified OCR output, the suspect word being a word having a character identified as a suspect character; and processing the suspect word with a second OCR engine to recognize the suspect word.

In another aspect, a system for optical character recognition (OCR) can include a first OCR engine, a first post-OCR engine and a second OCR engine. The first OCR engine is operable to process a document image to generate first OCR output which includes bounding boxes identifying clip images located in the document image and a character assignment assigning one or more characters to each clip image. The first post-OCR engine is operable to apply shape clustering to the first OCR output to produce a first modified OCR output which includes a modification of the assignment of characters to clip images and words recognized in the document image. The first post-OCR engine is operable to identify a suspect word in the first modified OCR output and the suspect word is a word having a character identified as a suspect character. The second OCR engine is operable to receive and process the suspect word to recognize the suspect word.

In another aspect, a method can include processing an image of a document to produce a collection of non-overlapping sub regions of the image where each sub region is at a first resolution; generating multiple clusters of visually similar clip sub regions where each of the sub regions in the collection is included in one of the clusters; generating a representative cluster image for each of the multiple clusters from the sub regions in the respective cluster at a second resolution higher than the first resolution; and producing a replica image of the document by replacing sub regions in the image with the representative cluster images for the clusters in which the respective sub regions are included.

In another aspect, a method can include applying an optical character recognition (OCR) process to an original image of a document to produce clip images at different locations of the original image, where each clip image is at a first resolution; classifying the clip images into clusters of clip images, where each cluster includes clip images that are assigned the same one or more characters codes by the OCR process and are identical or similar in size; transforming each clip image in each cluster into a transformed clip image at a second resolution higher than the first resolution; averaging transformed clip images in each cluster to generate a cluster image; and using cluster images of the clusters to replace corresponding clip images initially produced by the OCR process to generate a replica of the original image of the document at the second resolution.

In yet another aspect, a system can include an optical character recognition (OCR) engine and a post-OCR engine. The OCR engine is operable to process an original image of a document to produce an OCR output which includes clip images at different locations of the original image. Each clip image is at a first resolution. The post-OCR engine is in communication with the OCR engine to receive the OCR output. The post-OCR engine is operable to classify the clip images into clusters of clip images where each cluster includes clip images that are assigned the same one or more characters codes by the OCR engine and are identical or similar in size. The post-OCR engine is operable to transform each clip image in each cluster into a transformed clip image at a second resolution higher than the first resolution; average transformed clip images in each cluster to generate a cluster image; and use cluster images of the clusters to replace corresponding clip images initially produced by the OCR engine to generate a replica of the original image of the document at the second resolution.

Particular embodiments of the invention can be implemented to realize one or more of advantages. For example, large samples from voluminous documents that are printed or written in common styles include image information that is accessible when the number of the samples is sufficiently large. Such information can be used to provide enhanced accuracy in identifying characters. Shape clustering techniques described in this specification can be applied to process large samples to extract additional image information on pattern similarity and dissimilarity.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
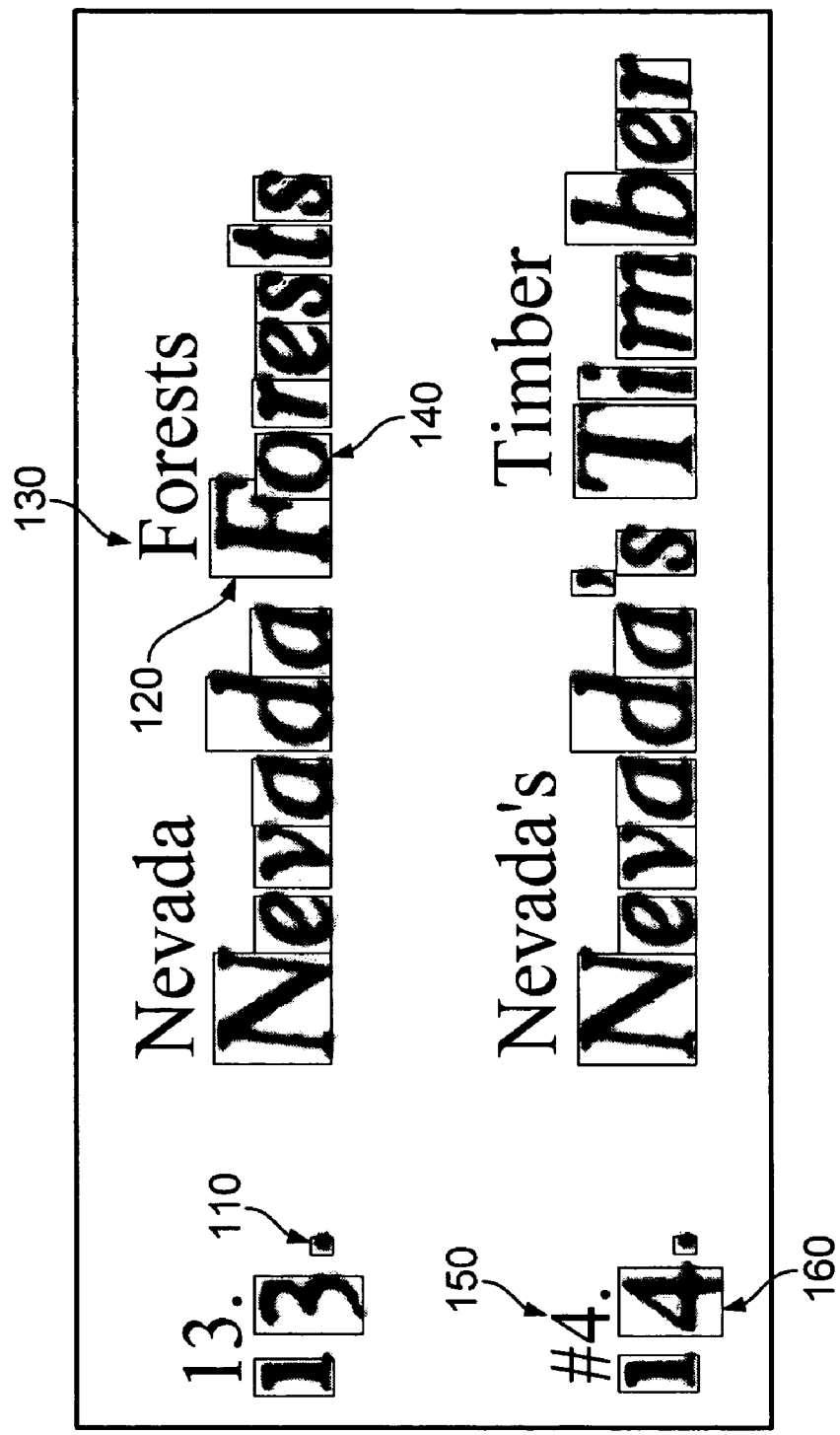
FIG. 1 illustrates an example of OCR-generated bounding boxes, associated clip images and assigned OCR character codes that are obtained an output from a particular OCR engine.

The OCR outputs of different OCR engines can may vary but many include character bounding boxes and OCR-assigned character codes for the bounding boxes. FIG. 1 illustrates an example of OCR-generated bounding boxes, associated clip images and assigned OCR character codes that are obtained from an output of a particular OCR engine. The OCR engine processes the original digital image of the document and segments the original image into separated clip image corresponding to separated recognized characters. The OCR engine produces and uses a bounding box to enclose and to identify one or more separately recognized characters. For example, bounding boxes 110, 120, 140 and 160 in FIG. 1 enclose the punctuation mark period, the letter "F," the letter "o," and the number "4," respectively. Each OCR character code can represent one or more characters. Each character can include one or more language tokens where a language token is a fundamental unit of a language and can include, for example, a letter, a numeral, and a symbol or mark. A symbol or mark can be, for example, a punctuation mark, a typographical mark or a diacritical mark. Hence, examples of a character can be a letter, a numeral, a symbol or mark, and a ligature of two or more language tokens. FIG. 1 includes specific examples of OCR characters generated from corresponding assigned OCR character codes for letters, numbers and punctuation marks. The text characters 130 and 150 are generated from OCR character codes assigned by the OCR engine to the portion of the document image contained within the bounding box 120 for letter "F" and the bounding box 160 for number "4," respectively.

In the example illustrated in FIG. 1, the OCR-engine-generated bounding boxes are rectangular and vary in their sizes and aspect ratios with the sizes and aspect ratios of the enclosed separated characters. In this example, each bounding box encloses the image pixels of one character.

The original images of the document to be processed may be one or more of binary images, gray scale images or colored images. Gray scale data or color data generally contains more detailed image information than binary data and thus is valuable to extraction of subtle or detailed image features. In some OCR engines, the original image is first transformed into a binary image and the transformed binary image is then processed for optical character recognition. This conversion can adversely affect the quality of the OCR processing and the post-OCR processing. Some of the techniques described below, therefore, access the original image to obtain the gray scale or color information for use in the post OCR processing and thus improve the accuracy of the processing.

The techniques described in this specification can be used to exploit image information embedded in large samples from voluminous documents that are printed or written in common styles to provide enhanced accuracy in identifying characters. Shape clustering techniques are applied to process the large samples to extract additional image information on pattern similarity and dissimilarity. Examples of voluminous documents that are suitable for applying the shape clustering techniques include, among others, books, collections of printed periodic publications such as newspapers, journals and magazines, and collections of handwritten documents by the same person or different people who have similar handwriting styles.

Figure 2:
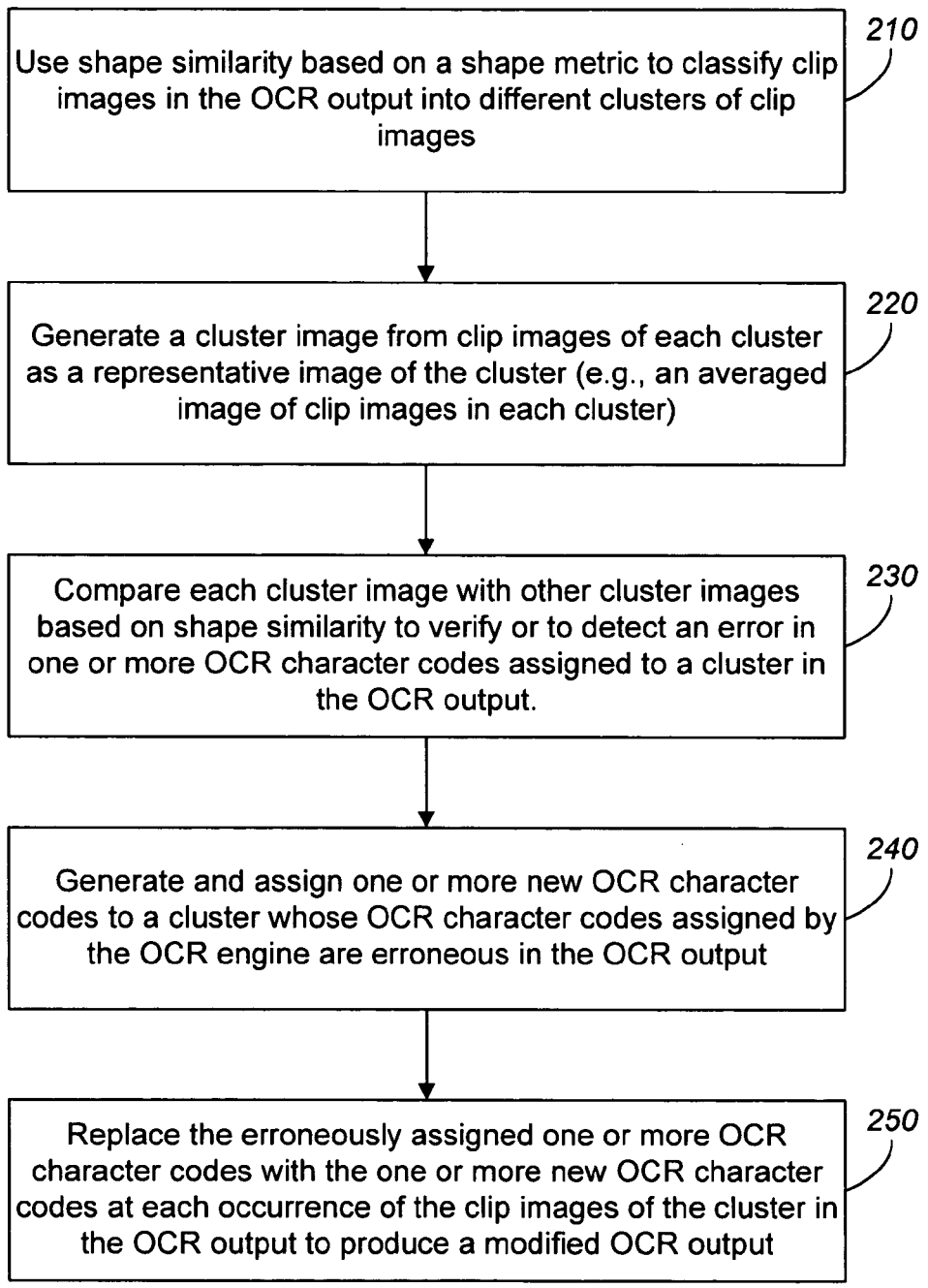
FIG. 2 shows an example method applying shape clustering in post-OCR processing.

FIG. 2 shows an example method applying shape clustering in post-OCR processing. Original digital images of a document are first processed by an OCR engine to produce an OCR output that includes separated bounding boxes surrounding clip images within the original digital images. The OCR engine also assigns OCR character codes to the bounding boxes, respectively. The post-OCR processing of this OCR output can be carried out as follows. The clip images defined by bounding boxes in the OCR output are classified into different clusters of clip images at step 210. The clip images classified in one cluster have been assigned one or more common OCR character codes and recognized as identical or similar sizes by the OCR engine and are determined by the post-OCR processing to have identical or similar shapes based on a suitable shape metric such as a shape distance. As an example, such a cluster can include identical or similar clip images for a letter "C" at or near a particular clip image size. Hence, the above classification process uses the suitable shape metric to compare shapes of different clip images assigned with one or more common OCR character codes and of identical or similar sizes. A shape distance between two of such clip images, for example, can be computed to determine the degree of shape similarity. This shape comparison separates the clip images into clusters where each cluster has clip images of identical or similar shape measured by the shape metric, of identical or similar sizes measured by sizes of respective bounding boxes (e.g., the number of pixels along one dimension of a bounding box), and assigned with one or more common OCR character codes. A cluster image can be generated to represent the clip images in each cluster (step 220). The cluster image can be a representative image of the clip images of each cluster and can be generated with different methods. For example, the clip images in a cluster can be averaged to produce an average image as the cluster image. For another example, one of the clip images in a cluster can be selected as the cluster image. After a cluster image is generated for each cluster, each cluster can be represented in various post-OCR processing operations by the cluster image and the one or more OCR character codes assigned to the cluster.

Notably, after the clusters are formed, some subsequent processing operations can be conducted at the cluster level. Each cluster image is compared with other cluster images based on shape similarity to verify assignment of one or more OCR character codes to a cluster and detect erroneously assigned one or more OCR character codes to a cluster in the OCR output (step 230). If no error is detected in comparing different cluster images, the one or more OCR character codes assigned to a cluster by the OCR engine is verified to be correct. If an error is detected, one or more new OCR character codes are generated and assigned to the cluster (step 240). This process of examining the assignment of the one or more OCR character codes in each cluster based on shape similarity between different clusters and correcting an erroneous assignment can be used in part to determine a confidence score for each assignment to a cluster image that indicates a level of reliability of each assignment. After the one or more new OCR character codes are generated, the one or more new OCR character codes are used to replace the erroneously assigned one or more OCR character codes at each occurrence of the clip images of the cluster in the OCR output to produce a modified OCR output (step 250). This correction of the OCR error is performed at the cluster level and is applied to all images in that cluster. This cluster-level processing can be more efficient than techniques that perform error correction one image instance or appearance in the original document at a time. For at least this reason, this cluster-level processing can be advantageous in efficiently processing voluminous documents in OCR processing.

When the comparison of cluster images based on shape similarity does not find an error in an assignment of one or more OCR character codes to a cluster by the OCR engine, the comparison has verified the assignment by the OCR engine. This verification can be valuable because, after the verification, the level of confidence of the assignment of one or more OCR character codes to the cluster can be raised. Hence, even through no correction has been made to the assignment of one or more OCR character codes initially generated by the OCR engine, the comparison of cluster images can improve the OCR quality in the post-OCR processing. A confidence score may also be affected by other factors, e.g., whether or not an assignment of one or more OCR character codes to a cluster is verified by manual identification and the number of clip images in a cluster. For purposes of this specification, manual means requiring effort of an independent entity such as a human being. A verification by manual identification can be used to assign a high confidence score to the cluster. Statistically, a large number of clip images in a cluster suggests a high confidence level for the cluster in comparison with a cluster with a smaller number of clip images.

Figure 3:
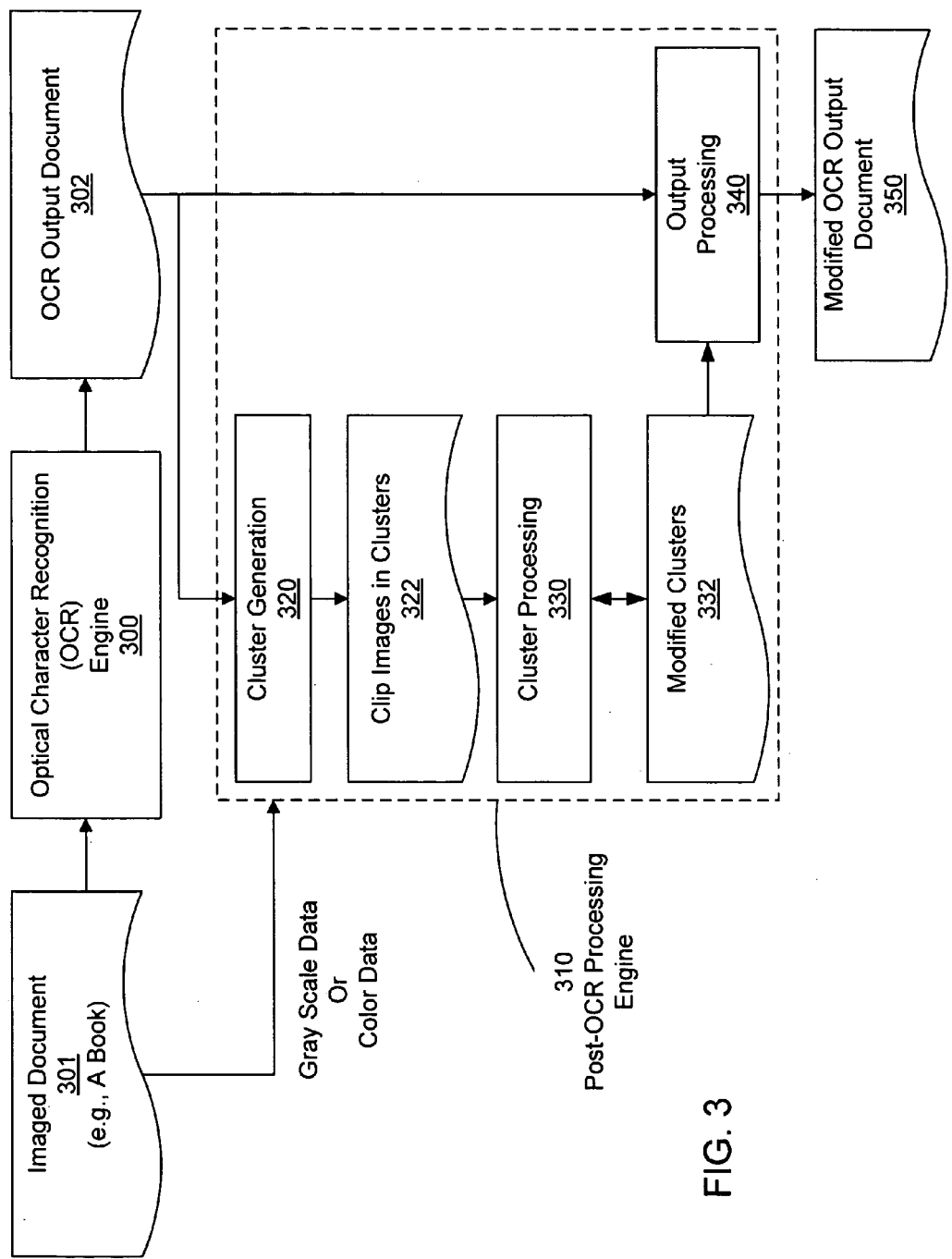
FIG. 3 is a block diagram showing an example post-OCR processing engine that applies shape clustering to the OCR output to produce a modified OCR output.

FIG. 3 is a block diagram showing an example post-OCR processing engine 310 that applies shape clustering to the OCR output to produce a modified OCR output. The OCR engine 300 is an OCR software module that processes the digital images of a document 301 and produces an OCR output 302. The post-OCR processing engine 310 is a software module that further processes the OCR output 302 to correct any OCR errors and thus produces a modified OCR output with improved OCR accuracy. In this example, the post-OCR processing engine 310 includes cluster generation software 320, cluster processing software 330 and output processing software 340. The cluster generation software 320 is operable to receive the OCR output 302 and to classify the separated clip images in the OCR output 302 into clusters 322 based on shape similarity of the clip images. The cluster processing software 330 processes the clusters 322 and can characterize or modify the clusters 322 to produce modified clusters 332 in which some clusters are further characterized s and some of the OCR errors in the OCR output 302 are corrected based on properties obtained from the clustering processing. The cluster processing software 330 can apply shape clustering to extract shape information from the clip images in each cluster. The extracted shape information can be used to compare shapes of cluster images for different clusters and to obtain shape differences of different clusters, especially the shape differences between clusters with different assigned OCR character codes. This shape comparison can then be used to determine whether there is an error in the assigned OCR character codes in the OCR output 302. The output processing software 340 can apply the modified clusters 332 to the OCR output 302 and to correct a detected error in the OCR output 302 in generating the modified OCR output 350. An error can be an incorrect assignment of one or more OCR character codes for a cluster. The output processing software 330 may also use the cluster information in the modified clusters 332 to correct an incorrect segmentation of a clip image in a word. Incorrect segmentation of a clip image is discussed below, e.g., with reference to FIGS. 10, 11A, and 11B.

The post-OCR system shown in FIG. 3 and its variations can be implemented in one or more computer servers in a communication network. The one or more computer servers can be used to provide the OCR engine 300 and the post-OCR engine 310. A client computer in the network can send the document image 301 to the one or more computer servers to request for an OCR output of the document 301. The OCR engine 300 and the post-OCR engine 310 process the client's document image and produce the OCR output 350 which can be sent to the client computer through the communication network.

As illustrated in FIG. 3, in some implementations, the cluster generation software 320 can directly access the original images of the document and retrieve gray scale or color data of the original images of the document that may not be available in the OCR output 302 to generate the clusters 322. Therefore, in this example, the gray scale or color data of the original images is used to verify and modify OCR character code assignment to clusters and to improve the processing accuracy in the post-OCR processing engine 310.

In other implementations, the cluster processing software 330 may select a cluster with questionable assigned one or more OCR character codes and obtain manual identification of the image for the selected cluster. This manual identification generates manual assignment of one or more characters with the image for the selected cluster. This specification describes below ways in which some implementations determine that assigned one or more OCR character codes are questionable.

An output of the cluster processing software 330 is modified clusters 332. The output processing software 340 uses the OCR character codes for the modified clusters 332 to update the OCR character codes in the OCR output 320 to produce the modified OCR output 350. Like the processing in the cluster processing software 330, the output processing software 340 operates at the cluster level in updating the OCR character codes in the OCR output 320. The output processing software 340 may also select a word including a suspect cluster with a questionable assignment of one or more OCR character codes for re-segmenting, i.e., re-segmenting the associated cluster image into two or more new cluster images and assigning OCR character codes to the new cluster images based on matched images from selected clusters with high confidence scores, such as clusters with a large number of clip images, clusters with character codes obtained via manual identification.

Figure 4:
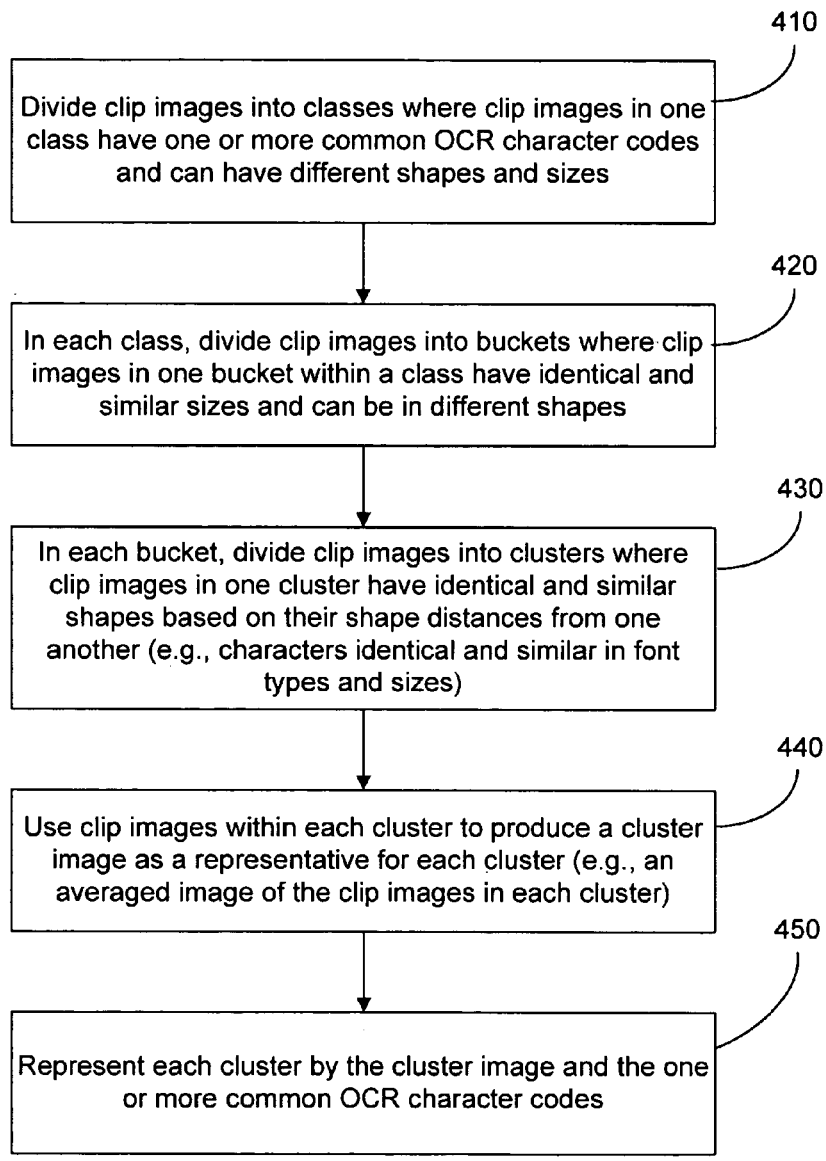
FIG. 4 is a flowchart showing an example process for cluster classification by the cluster generation engine in FIG. 3.

FIG. 4 is a flowchart showing an example process for cluster generation that can be performed by the cluster generation software 320 in FIG. 3. In this process, the cluster generation software 320 uses information in the OCR output 302 on shapes and sizes of clip images in addition to the OCR character codes assigned by the OCR engine 300 to classify the clip images into clusters, buckets and classes. The clip images classified in one cluster have been assigned one or more common OCR character codes by the OCR engine 300 and were recognized by the OCR engine 300 to approximately be of a particular clip image size based on the sizes of respective bounding boxes. In particular, in this process, clips images in one cluster are selected based on a shape metric to be identical or similar in shape with one another. In some implementations, the font type information is not explicitly used in generating the clusters by the cluster generation software 320. The shape comparing process used in generating the clusters, however, tend to place clip images for a character of identical or similar fonts and in identical or similar font sizes into the same cluster. For example, clip images for the letter "g" in the Time Roman font and of the 12-point font size may be classified in one cluster while clip images for the letter "g" in the Time Roman font and of the 10-point font size are in a different cluster. Clusters can be grouped into buckets where each bucket has clusters that are assigned one or more common OCR character codes in identical and similar sizes. All buckets that are assigned with the one or more common OCR character codes can be grouped together as a class of clusters identified by the common one or more OCR character codes. For example, all clusters of clip images for the letter "c" in different fonts and font sizes are in the "c" class. Hence, the clip images for the twenty-six alphabetic letters in English are classified in twenty-six different classes.

In the example cluster generation in FIG. 4, the cluster generation software 320 first divides clip images into classes where clip images in one class are assigned one or more common OCR character codes regardless their shapes and sizes (step 410). In each class, the cluster generation software 320 divides clip images into buckets where clip images in one bucket have identical or similar sizes but can be different shapes such as different font types (step 420). This is done in all classes. In each bucket, the cluster generation software 320 divides clip images into clusters where clip images in one cluster have identical or similar shapes based on their shape distances from one another, e.g., characters identical or similar in font types and sizes (step 430).

Figure 5:
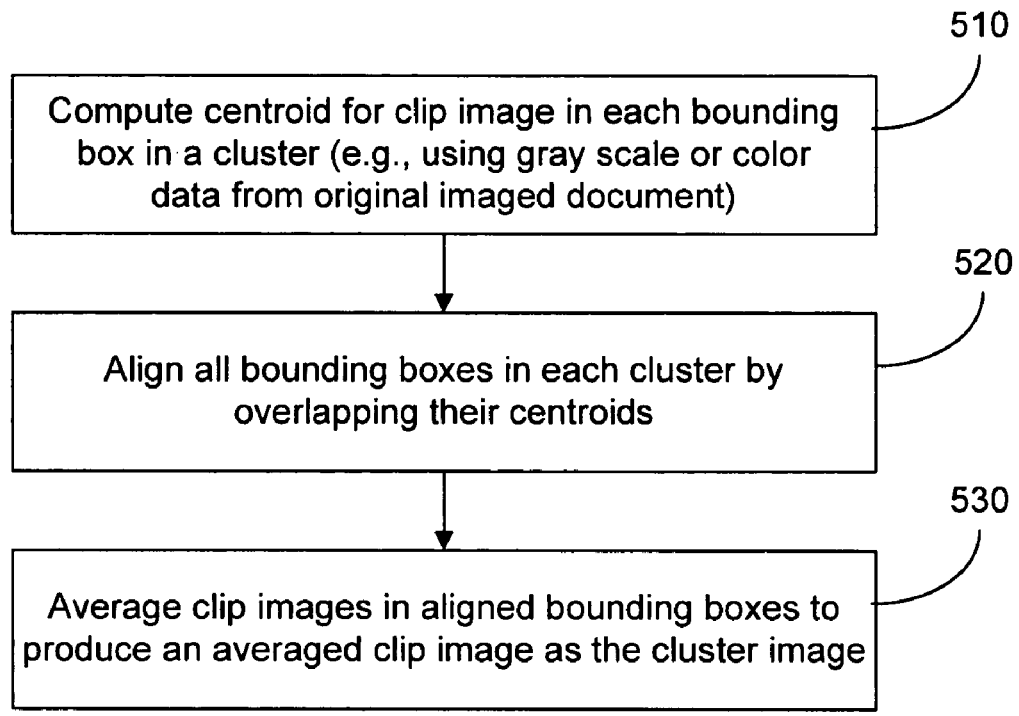
FIG. 5 illustrates one exemplary process for computing the cluster image by averaging clip images in a cluster aligned at their centroids.

After the classification of the clip images into clusters, the cluster generation software 320 generates a cluster image for each cluster that represents the shape of the cluster. The cluster image is a representative image of the clip images in the cluster and can be generated by, e.g., averaging clip images in each cluster or selecting a particular clip image from the clip images (step 440). As a result, each cluster can be represented by the cluster image and the respective one or more OCR character codes assigned to the cluster (step 450). In the subsequent processing by the post-OCR engine 310, various post-OCR processing operations can be performed at the cluster level without processing individual clip images. A number of averaging techniques can be applied to obtain the cluster image. FIG. 5 illustrates one example process for computing the cluster image by averaging clip images aligned at their centroids. The image information within the bounding box for each clip image can be used to compute a centroid of each clip image (step 510). Bounding boxes for different clip images within a cluster are aligned with respect to their computed centroids (step 520). The pixel values of the aligned clip images for the cluster are averaged to generate the averaged image as the cluster image (step 530). Each pixel value can be a binary value, a gray scale value or a color value depending what pixel values for the clip images were initially used in comparing shapes of different clip images by the cluster generation software 320 during cluster generation. The gray scale or color values for the pixels of the clip images can be used to generate the clusters and to compute a cluster image with detailed and subtle features that may not be available from the cluster image obtained from binary pixel values. When the OCR engine 300 provides only binary image information in the OCR output 302, the post-processing engine 310 can directly access the original images of the document 301 to obtain the gray scale or color information. The position coordinates of the bounding box for each separated clip image in the OCR output 302 are known and the bounding box can be applied to the original images of the document 301 based on the known position coordinates to obtain the corresponding gray scale or color pixel information from the original images of the document 301. The obtained gray scale or color information for each clip image is then used to compare the shapes of clip images for generating the clusters 320 and to compute the averaged images of clip images within each cluster as the corresponding cluster image.

As described above, a clip image as a basic unit of a cluster can be an image that represents one or more OCR character codes. Therefore, two or more OCR character codes can be assigned to a single clip image. Many OCR engines are designed to use a single bounding box as a basic unit to assign one or more OCR character codes to the clip image associated with each single bounding box. In implementing clustering techniques in this specification, a basic unit for a cluster can be a clip image associated with a single bounding box produced by the OCR engine, and a clip image associated with two or more adjacent bounding boxes produced by the OCR engine. In the latter case, the joint clip image is a "joint" clip image which is a combination of two or more clip images respectively associated with two or more adjacent bounding boxes in the received OCR output. Accordingly, the cluster generation software 320 can be designed to classify joint clip images in the received OCR output into joint clusters of joint clip images that are identical or similar in shape and size and are associated with the same characters assigned by the OCR engine to the respective adjacent bounding boxes. When a joint clip image associated with two or more adjacent bounding boxes produced by the OCR engine is used as the basic unit for forming a cluster, the cluster generation software 320 in FIG. 3 essentially treats the respective two or more adjacent bounding boxes as a joint single bounding box in determining the size of the clip image. Such a joint bounding box is not produced by the OCR engine and is a product of and generated by the cluster generation software 320 in the present post-OCR processing engine 310.

In various processing operations described in this specification, the use or treatment of such a joint bounding box having two or more adjacent OCR-generated bounding boxes can be identical or similar to the use or treatment of a single OCR-generated bounding box, including computation of shape distances of clip images associated with bounding boxes, centroids of bounding boxes, alignment of different bounding boxes, averaging clip images associated with bounding boxes, obtaining manual identification and interpolation a clip image in a bounding box. Hence, a bounding box in this specification can be a single bounding box generated by an OCR engine or a bounding box that joins two or more adjacent bounding boxes generated by the OCR engine. Accordingly, a joint clip image associated with a joint bounding box that joins two or more adjacent bounding boxes generated by the OCR engine can be a combination of individual clip images that are respectively associated with the two or more adjacent bounding boxes generated by the OCR engine, and can be treated in the same way as a clip image associated with a single bounding box generated by the OCR engine in cluster processing.

Notably, joint clip images associated with bounding boxes each joining two or more adjacent bounding boxes generated by the OCR engine can be clustered in the clustering processing described in this specification. Hence, in comparing each cluster to all clusters of a different character, the comparison includes clusters in which each cluster member has a bounding box that joins two or more OCR-generated bounding boxes and thus is assigned a number of characters. As a result, the comparison in a clustering process can yield multiple disagreements with different clusters.

For example, a "r" cluster assigned an OCR character code for the character 'r' includes clip image samples for the character "r." Some of these clip image samples in the "r" cluster, e.g., a "r" clip image next to a "n" clip image, may also be included in a 2-character cluster assigned an OCR character ligature of "rn" as part of clip images for "rn." The cluster image for the "rn" cluster can be closer in shape to a "m" cluster than many other clusters, including the "r" and "n" clusters. While there may be conflicting evidence, the overall process for determining whether each cluster is a suspect cluster, an acceptable cluster, or an island cluster remains the same. The above example of n=2 extends to n-gram clusters and as n increases, the computational requirements increase and the accuracy return may decrease.

The cluster processing software 330 evaluates each cluster 322 to determine whether the one or more OCR character codes originally assigned to each cluster by the OCR engine 300 is sufficiently reliable for use in the modified OCR output 350. When one or more OCR character codes originally assigned to a cluster by the OCR engine 300 are determined to be unreliable, the cluster processing software 330 can perform additional processing on the cluster to obtain one or more OCR character codes that are more reliable to represent the cluster image. This processing modifies some of the clusters 322 to produce the modified clusters 332. The assigned OCR character codes for the modified clusters 322 are then used to produce the modified OCR output 350.

The level of the reliability of one or more OCR character codes assigned to a particular cluster is also referred to as a level of confidence and can be numerically represented by a confidence score. A threshold confidence score may be set for the cluster processing software 330 to identify as acceptable clusters those having confidence scores above the threshold confidence score and as suspect clusters those having confidence scores below the threshold confidence score. A number of factors or parameters can be used, either individually or in certain combinations, to decide the confidence scores. One relevant factor is the number of clip images in a cluster. Statistically, a large number of clip images in a cluster suggests a high confidence level for the cluster in comparison with a cluster with a smaller number of clip images. Another relevant factor is the manner of obtaining one or more OCR character codes for a clip image or a cluster image which can reflect the reliability of the particular one or more OCR character codes. For example, a cluster image can be identified manually by a person, and the corresponding one or more OCR character codes generated based on the manual identification can be considered as a highly reliable assignment and thus be assigned a high confidence score.

Examples described below provide details on how to use the number of clip images in a cluster and the shape similarity between a cluster and other clusters to determine the confidence scores and to rank the clusters based on such scores.

The cluster processing software 330 can correlate the shape information of different clusters generated by the cluster generation software 320 to detect and correct errors in the OCR character codes assigned by the OCR engine 300 and to verify the OCR character codes assigned by the OCR engine 300. During this process, the software 330 can modify some of the clusters by correcting errors in the OCR output 302 to produce modified clusters 332, more specifically, to produce an association of cluster images and character codes by verifying (and correcting if necessary) the character code assignments for each cluster image. In some implementations, the cluster processing software 330 applies a shape metric to compute a shape distance as a measure of the shape difference between the cluster images of two clusters and as one factor to determine the confidence score of a cluster. This use of a shape metric for comparing shapes can also be used in comparing clip images when the clusters 320 are first generated by the cluster generation software 320. Hence, the example techniques below for computing the shape distances between two cluster images in the cluster processing software 330 can be used to compute shape distances between to clip images in the cluster generation software 320.

A number of shape metrics may be used in the cluster processing software 330. For example, for binary images, various shape distances based on the Hausdorff distance can be used. Similar to obtaining the cluster images in the cluster generation software 320, greater accuracy in shape comparison can be achieved by using the color or grayscale representation of the pixel values for the clip images in computing shape distances. When the OCR output 302 provides only binary image information for the clip images, the color or grayscale information can be directly obtained by the post-OCR engine 310 from the original image 301 of the document processed by the OCR engine 300. When the cluster generation software 320 has already obtained the color or grayscale information from the original image 301 in computing the cluster images for the clusters 322, the cluster processing software 330 can use the same color or grayscale information to compute the shape distances. Otherwise, the cluster processing software 330 can access the original image 301 for the color or gray scale information.

To determine the shape distance between two cluster images I and J, the cluster images I and J are aligned based on their centroids of the bounding boxes. In some implementations, the shape distance between aligned cluster images I and J can be computed as follows:

$$\sqrt[n]{\sum_P [I(P) - J(P)]^n}$$

where n is a positive integer greater than 1, I(P) and J(P) are gray scale or color pixel values of the two cluster images I and J at a pixel location P common to both images upon alignment of their bounding boxes and where the sum is made over all pixel positions.

The cluster processing software 330 can use the above or other shape metric to evaluate the confidence level of the one or more OCR character codes assigned to each cluster based on the shape distances between the cluster and other clusters. For example, a threshold shape distance can be selected to identify "island" clusters that are away from the closest clusters by a shape distance greater than the threshold shape distance. When a cluster is too far away from all other clusters in all buckets and classes, that cluster can no longer be reasonably compared with other clusters based on the shape distances alone to approve or disapprove the level of confidence of the assigned one or more OCR character codes for the cluster image, especially for clusters assigned different OCR character codes. Accordingly, the cluster processing software 330 may identify an island cluster as a suspect cluster whose level of confidence is unacceptable and is subject to further processing or verification. For example, the cluster processing software 330 may select an island cluster for manual identification by a person and thus convert a suspect cluster into an acceptable cluster with a high confidence score.

Another parameter for measuring the level of confidence of a cluster is the number of clip images in the cluster. That a cluster has a large number of clip images directly suggests a high level of confidence for the cluster. For this reason, the cluster processing software 330 can use a threshold value for the number of clip images in the cluster to evaluate clusters. When the number of clip images in a cluster is less than the threshold value, the cluster is labeled as a suspect cluster and is subject to further processing and verification. One implementation of the further processing and verification in the cluster processing software 330 is manual identification by a person. The result of the manual identification can be used to convert a suspect cluster into an acceptable cluster with a high confidence score.

For clusters that are not suspect clusters, the cluster processing software 330 can identify such clusters as acceptable clusters and use them for producing the modified OCR output 350. The assignment of one or more OCR character codes for a suspect cluster may be included in the modified OCR output 350 when additional processing or verification for that suspect cluster is not available. The cluster processing software 330 can temporarily include a suspect cluster in the modified OCR output 350 and update the suspect cluster when additional processing or verification for that suspect cluster becomes available.

Clusters with the highest numbers of clip images in their respective classes can be identified as master clusters because such a master cluster tends to be more likely to be an acceptable cluster than a non-master cluster in the same class. However, a master cluster may be a suspect cluster under various circumstances. For example, a master cluster can be an island cluster or can have a number of clip images less than the threshold value set in the cluster processing software 330.

The cluster processing software 330 can apply the threshold shape distance and the threshold value for the number of clip images in a cluster to rank and process the clusters 322 output by the cluster generation software 320. In one implementation, all clusters in all classes are ranked in a descending order based on the numbers of clip images or instances in the clusters and process one cluster at a time in this order. For each cluster C, if the cluster C is a master cluster in its class, the cluster processing software 330 can skip the processing and proceed to process the next smaller cluster. In some implementations, if the cluster C is not a master cluster, the cluster processing software 330 determines the distance of the cluster C to the nearest cluster C' in terms of a shape metric, e.g., a shape distance. The cluster C' is a cluster that is larger than the cluster C and is not flagged as suspect. The cluster C' may be a master cluster, or a cluster processed before the cluster C is processed in the sequence defined above. If the cluster C' is found to have a different associated OCR character code than that of the cluster C, the cluster processing software 330 determines that the OCR engine 300 has made an error in the assignment to the cluster C. Accordingly, the cluster processing software 330 can change the OCR character code assigned to the cluster C and assign a different OCR character code associated with the cluster C' to the cluster C. If the cluster C' is found to have the same associated OCR character code as that of the cluster C, the cluster processing software 330 determines that the OCR engine 300 has made an correct assignment to the cluster C. The above process can be iterated by the cluster processing software 330 to deal with cases where the nearest cluster C' to the currently considered cluster C is flagged as a suspect cluster. When this occurs, the cluster processing software 330 continues to process other clusters to search for a non-suspect C' until no cluster C has a suspect C' in the same class.

The cluster processing software 330 can execute the above process to detect OCR errors and correct some of the errors by changing the OCR character codes assigned to some clusters. This process produces the modified clusters 332 with improved accuracy in assignment of the OCR character codes. The output processing software 340 can apply the modified clusters 332 to the OCR output 302 to produce the modified OCR output 350 with reduced errors.

The cluster processing software 330 can also be programmed to apply a selected shape metric to compute the shape distance between the averaged images of two clusters for all clusters in the entire document and then classifies the clusters into master clusters, acceptable clusters, suspect clusters, and island clusters based on the shape distances and the number of images in each cluster. These different categories of clusters can be further processed by comparing with one another to change some of the suspect clusters into acceptable clusters.

Figure 6:
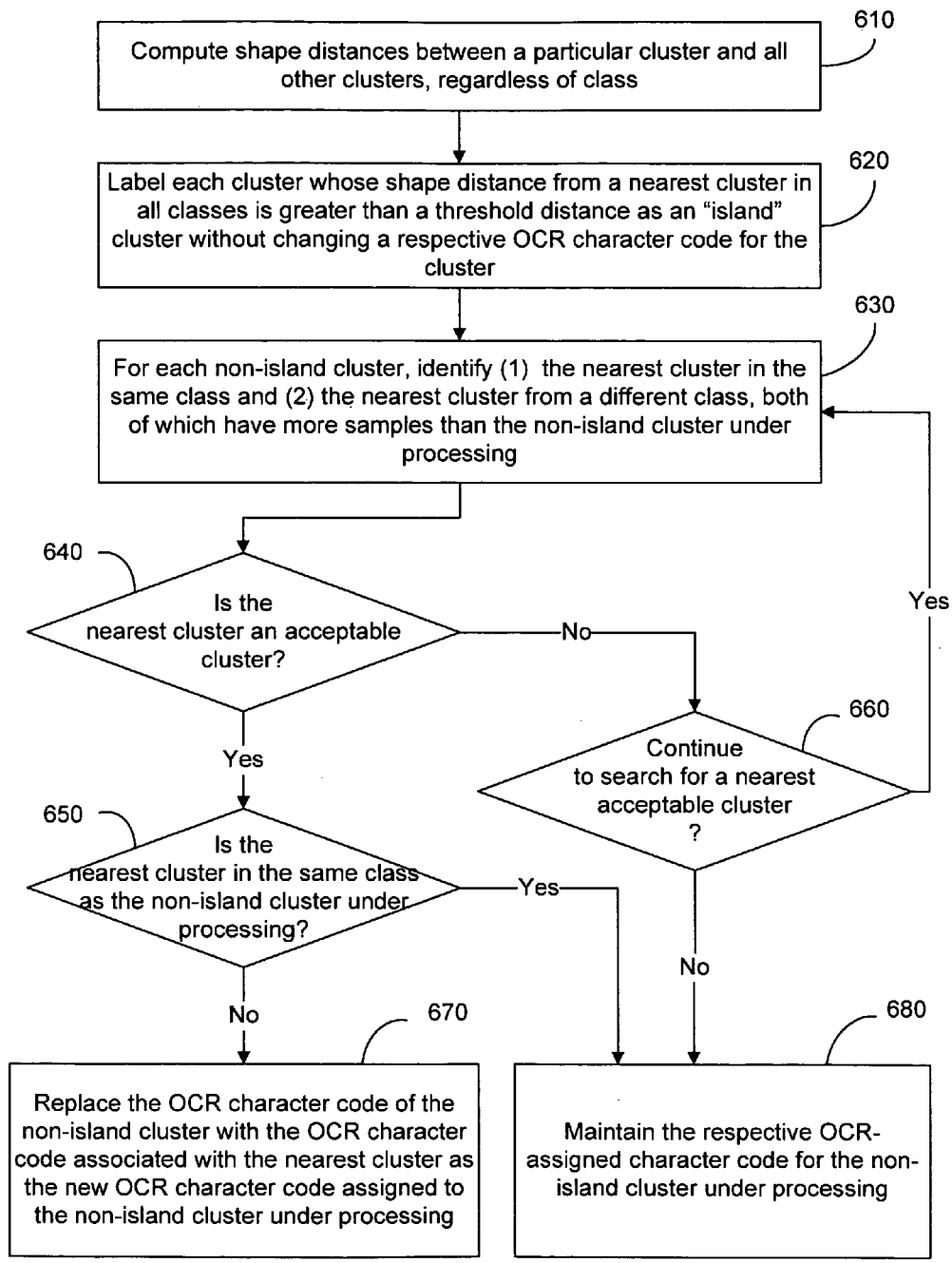
FIG. 6 illustrates an example of a method that can be performed by the cluster processing software 330 to use the shape clustering for OCR character code assignment.

FIG. 6 illustrates an example process performed by the cluster processing software 330 to use the shape clustering for OCR character code assignment. In this example, the cluster processing software 330 evaluates the confidence level of the initial OCR character code assigned to a cluster and, if appropriate, replaces the initial one or more OCR character codes assigned to the cluster with different one or more OCR character codes for another cluster that has the shortest shape distance to, the cluster under processing. The cluster processing software 330 evaluates and processes all clusters to produce a modified collection of clusters 332 for the document 301 with reduced OCR errors that are present in the original OCR output document 302. More specifically, the shape distances between cluster images of a particular cluster and all other clusters, regardless of class, are computed (Step 610). A cluster that has a shape distance from a nearest cluster in all classes is greater than a threshold distance is labeled as an "island" cluster without changing respective one or more OCR character codes for the cluster (Step 620). This process classifies the clusters as island clusters and non-island clusters. For each island cluster, the cluster processing software 330 labels such a cluster as a suspect cluster and invokes a different processing mechanism to process the cluster, e.g., using manual identification or re-segmenting each word that contains a clip image in this suspect cluster. For each non-island cluster, the associated nearest cluster in the same class and the associated nearest cluster from a different class can be identified and each of such nearest clusters has more sample clip images than the current non-island cluster under processing (Step 630). Next, the cluster processing software 330 determines whether the nearest cluster between the above two selected clusters is an acceptable cluster, i.e., being sufficiently reliable for use in the modified OCR out 350 (Step 640). As described in earlier sections of this specification, whether a cluster is acceptable can be determined by, e.g., a confidence score assigned to the cluster.

If the nearest cluster is an acceptable cluster and is in a different class from the non-island cluster under processing, the one or more OCR character codes of the current non-island cluster under processing are replaced with the one or more OCR character codes associated with the nearest cluster as the new one or more OCR character codes for the current cluster (Steps 650 and 670). If the nearest cluster is an acceptable cluster and is in the same class from the non-island cluster under processing, the one or more OCR character codes of the current cluster are verified as being correct and thus are maintained without change for use in the modified OCR output 350 (steps 650 and 680).

On the other hand, if the nearest cluster is not an acceptable cluster, the cluster processing software 330 determines whether to continue to search for an acceptable cluster that is nearest to the current non-island cluster under processing (step 660). If yes, the above search process is iterated; otherwise, the one or more OCR character codes of the current cluster under processing are maintained and labeled as acceptable for use in the modified OCR output 350 (Step 680). In the latter case, the shape comparison does not confirm or reject the original OCR assignment.

Figure 7:
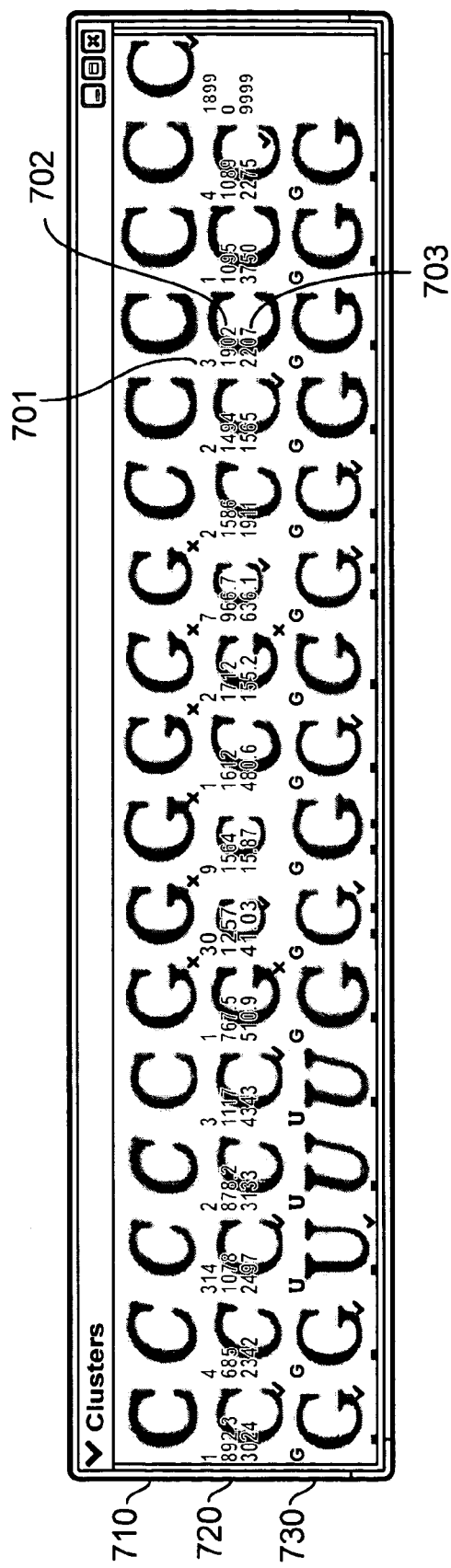
FIGS. 7, 8 and 9 show examples of clusters obtained from the output of an OCR engine and associated cluster parameters computed by the cluster processing engine in FIG. 3.
Figure 8:
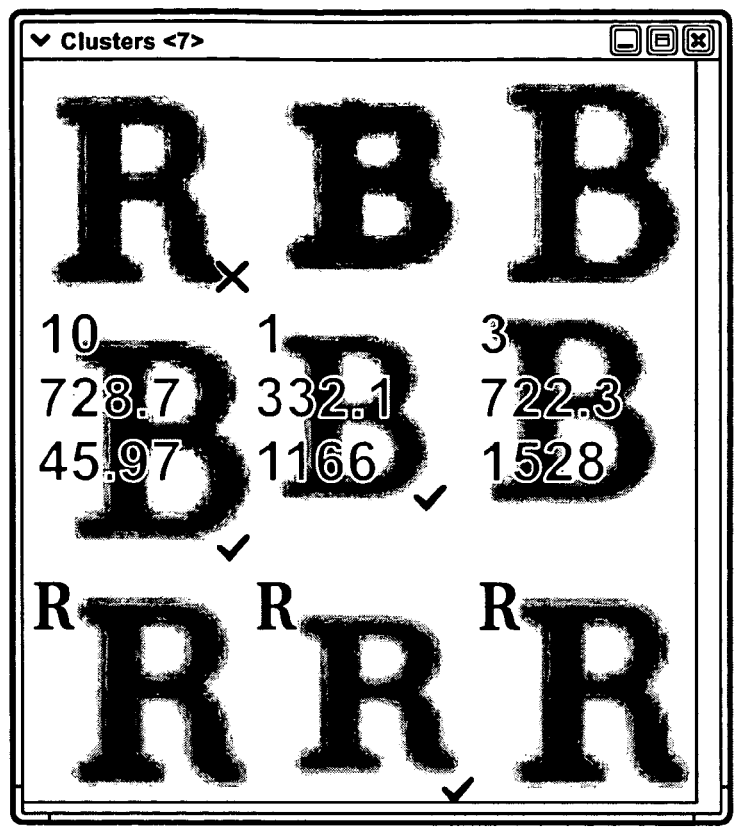
Figure 9:
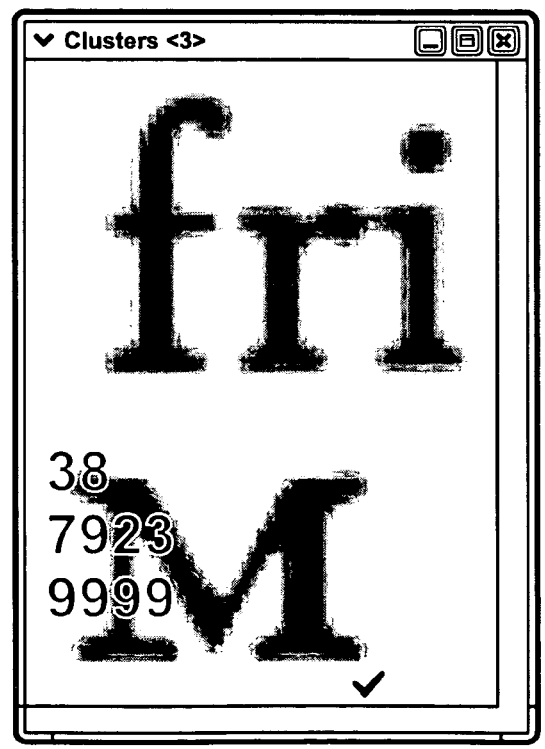

FIGS. 7, 8 and 9 show examples of clusters obtained from the output of an OCR engine and results of post-OCR processing of the clusters. Cluster parameters computed by the cluster processing software 330 as described above are labeled. In FIG. 7, the top row 710 represents "C" cluster images formed from one size as classified by the OCR engine. These clusters are slightly different in shape and size and also include six "G" clusters in the central region of the top row 710 that are incorrectly classified as "C" clusters by the OCR engine. The middle row 720 shows the corresponding closest matches of all "C" clusters in the "C" class. Note that the middle row includes two "G" clusters that are incorrectly classified by the OCR engine as the "C" clusters. The bottom row 730 has the corresponding closest matches of all clusters that are not in the "C" class. The label in the upper-left corner of each cluster image in the bottom row 730 shows the OCR character of the OCR character code assigned to the cluster. In the middle row, three numbers 701, 702 and 703 are cluster parameters that characterize the cluster in the second row 720. The top number 701 is the number of samples in each of the top row of clusters, the second number 702 is the shape distance between the top "C" cluster and the middle other "C" cluster, and the bottom number 703 is the shape distance between the top "C" cluster and the bottom nearest non-"C" cluster. For example, the top-right C cluster in FIG. 7 has 1899 samples. If the middle number is less than the lower number, the corresponding top cluster is likely to be correctly classified by the OCR engine as a "C" cluster; otherwise, the OCR engine likely made an error as indicated by red colored examples for the misclassified "G" clusters in the top row. In FIG. 7, the total number of samples for the incorrectly labeled clusters is (1+30+9+1+2+7)=50 and thus 50 errors can be corrected automatically by the cluster-level processing.

FIG. 7 further shows the level of confidence for the OCR assignments for the clusters based on the shape clustering processing. The clustering processing software 330 uses a labeling parameter to label whether a cluster is acceptable, verified with a high confidence score, or suspect or rejected with a wrong OCR assignment. FIG. 7 graphically represents this labeling parameter by using a mark in the lower right corer of each cluster image. This mark in the lower right corner of each cluster image is used here to ad the understanding the characterization and labeling of a cluster and may not be used by the post-OCR processing software. The lower right corner of a cluster image is not marked if the cluster is acceptable but is not verified to have a high confidence score via manual identification or other means. The lower right corner of a cluster image is marked with a check sign if the cluster is acceptable and is verified to have a high confidence score via manual identification or other means. The lower right corner of a cluster image is marked with a cross sign if the cluster is unacceptable and is verified to be wrong. The incorrectly labeled clusters are marked with a cross sign in their lower right corner, such as the six "G" clusters in the central region of the top row 710 which were incorrectly assigned as "C" by the OCR engine. FIG. 8 shows examples of clusters that are all initially recognized as "B" by an OCR engine. As illustrated in FIG. 8, a cluster analysis by the cluster processing software 330 correctly finds that the distance to the nearest non "B" cluster, in this case and "R" cluster, is less than the distance to the closest "B" cluster and thus that 10 out of 14 clusters are actually "R" clusters. As indicated by the cross sign in the lower right corner, the first cluster for the letter "R" on the left end of the top row in FIG. 8 is incorrectly assigned as a "B" cluster by the OCR engine.

FIG. 9 shows an example of an "island" cluster where 38 examples of the clip image for the sequence "fri" are, incorrectly, identified as "M" by an OCR engine. If manual identification is used to correct this OCR error and to assign the proper ligature "fri" to the island cluster, the island cluster can be re-classified into an acceptable cluster with a high confidence score. After this re-classification, a single cluster-level correction based on the newly assigned character "fri" can be used to correct all 38 errors in the document.

The example in FIG. 9 suggests that an OCR engine may incorrectly segment a group of different characters into a single clip image (e.g., "fri") and hence treat the group as a single character (e.g., "M"). A cluster with such a segmentation error tends to be larger measured by the size of its bounding box than typical clusters of single characters. Manual identification by a person can be used to correct such an error. The cluster processing software 330 can be used to automatically select a suspect cluster for manual identification and use the result of the manual identification to update assignment of the one or more OCR character codes for the cluster, thus transforming the suspect cluster into an acceptable cluster Alternatively, the post-OCR engine 310 in FIG. 3 can re-segment such a large suspect cluster image into two or more smaller cluster images by searching a match with cluster images of acceptable clusters with high confidence scores obtained by shape clustering including manual identification.

In this process, an acceptable cluster with a high confidence score is selected from a pool of acceptable clusters with high confidence scores in the modified clusters 332 and is used as a cluster image template. The cluster image template and the suspect cluster are compared by spatially sliding the template through the suspect cluster image, one pixel at a time, to compare the shape similarity between the cluster image template and each subsection of the suspect cluster. This matching process is repeated with all acceptable clusters in the pool to identify all matches. The two or more smaller cluster images produced in this matching process correspond to two or more new clusters and the new clusters are then processed.

This use of a pool of acceptable clusters with high confidence scores as cluster image templates can process a suspect word in the OCR output 302 after the cluster shaping. In one implementation, the output processing software 340 can be programmed to run each of the cluster image templates through the suspect word to identify any matches. When there is at least one match, the image of the suspect word, which was segmented by the OCR engine into clip images in different adjacent bounding boxes in the OCR output 302, is re-segmented into new clip images in different adjacent new bounding boxes. Each new bounding box can be, for example, a clip image of a single character or a ligature.

Figure 10:
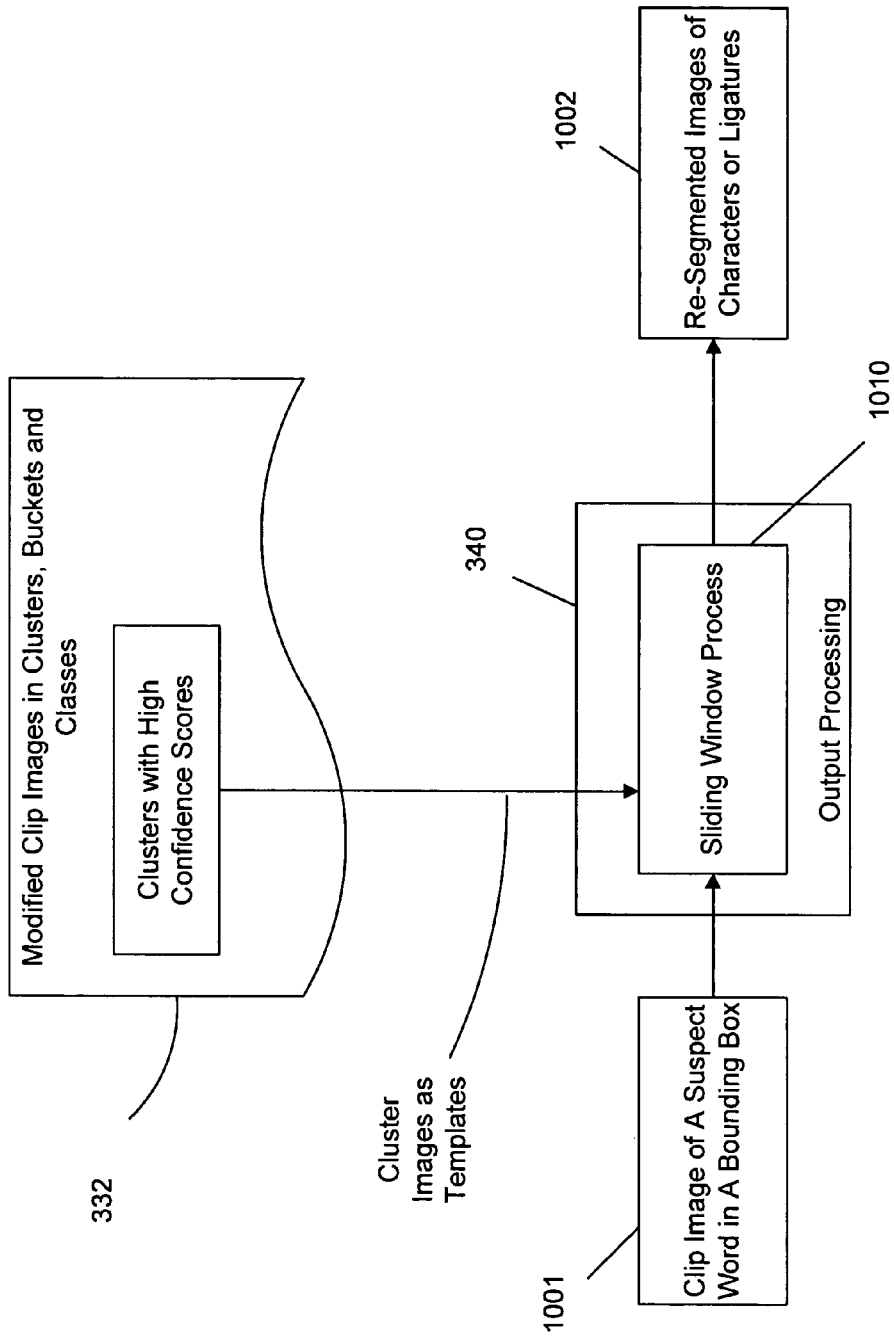
FIG. 10 shows an example of a sliding window process where a suspect cluster image is re-segmented into smaller cluster images by using a cluster with a high confidence score as a cluster image template for re-segmenting the suspect cluster image.

FIG. 10 shows an example of a sliding window process 1010 where the clip image 1001 of a suspect word is re-segmented into smaller images 1002 of characters or ligatures by using a pool of selected clusters with high confidence scores in the modified clusters 322 as cluster image templates. This pool of selected clusters can include, for example, clusters that are obtained via manual identification, clusters that have large numbers of sample clip images, clusters that have been verified to be correct by shape clustering. The sliding window process 1010 compares each of the selected clusters with subsections of the suspect word and then re-segments suspect word based on the matches with the cluster image templates. This sliding window process 1010 can be implemented by software as part of the output processing software 340.

The cluster processing software 340 selects a cluster image of a selected cluster as a cluster image template. This selected cluster has a high confidence score for the assigned one or more OCR character codes. The cluster processing software 340 first aligns the cluster image template with different image portions within the clip image 1001 of the suspect word along a predetermined sliding direction, one portion at a time. The predetermined sliding direction can be, for example, the horizontal direction from the left to the right. Hence, the cluster image template is aligned with different portions within the suspect word. Shape metric distances between the cluster image template and the different portions of the word image are obtained, respectively. The obtained shape metric distances are used to determine whether a portion of the word image matches the cluster image template. A matching portion of the word image that matches the cluster image template is separated from on or more other portions of the word image. The one or more OCR character codes assigned to the selected cluster are assigned to the separated matching portion of the word image in the modified OCR output.

Figure 11A:
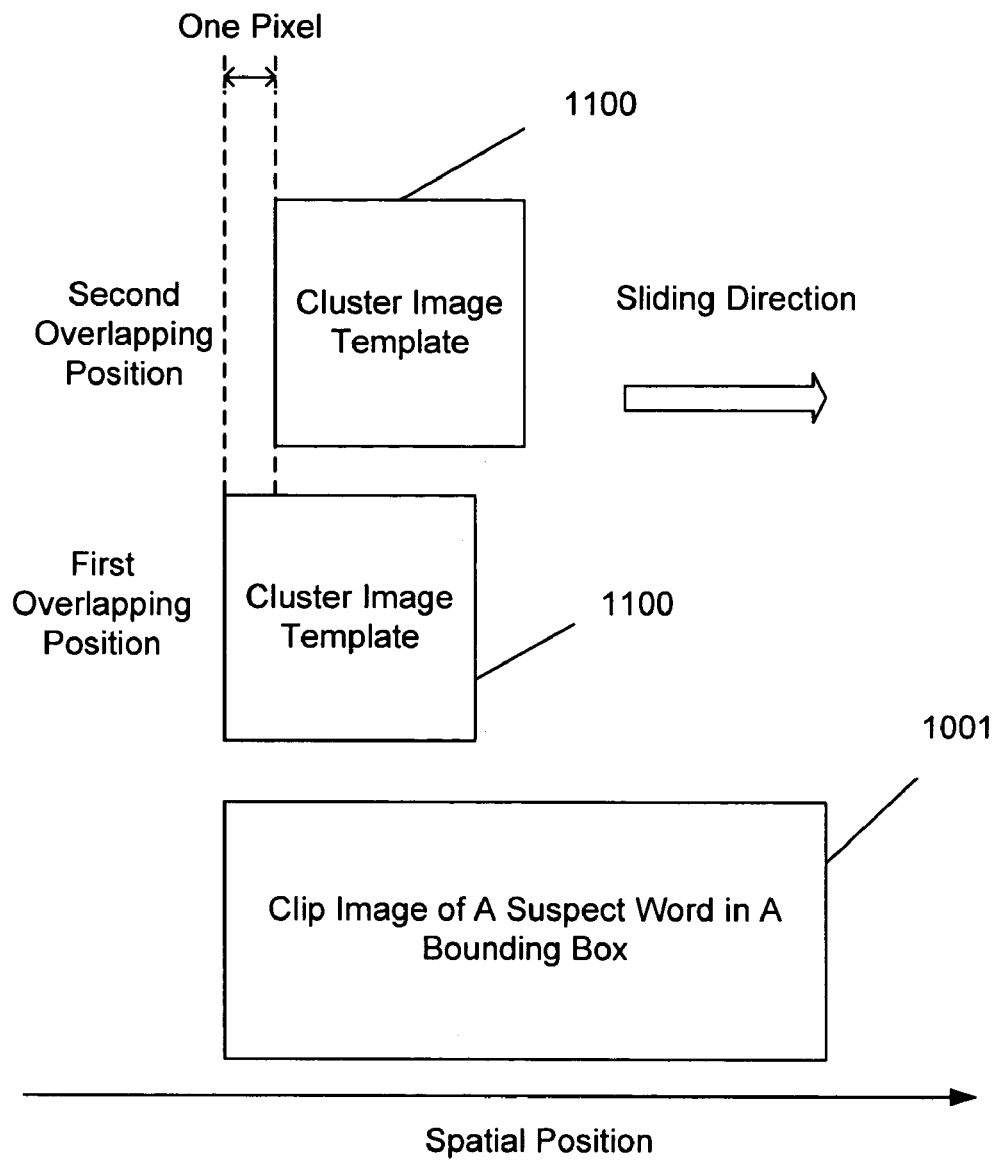
FIGS. 11A and 11B show operation details of the sliding window process in FIG. 10.
Figure 11B:
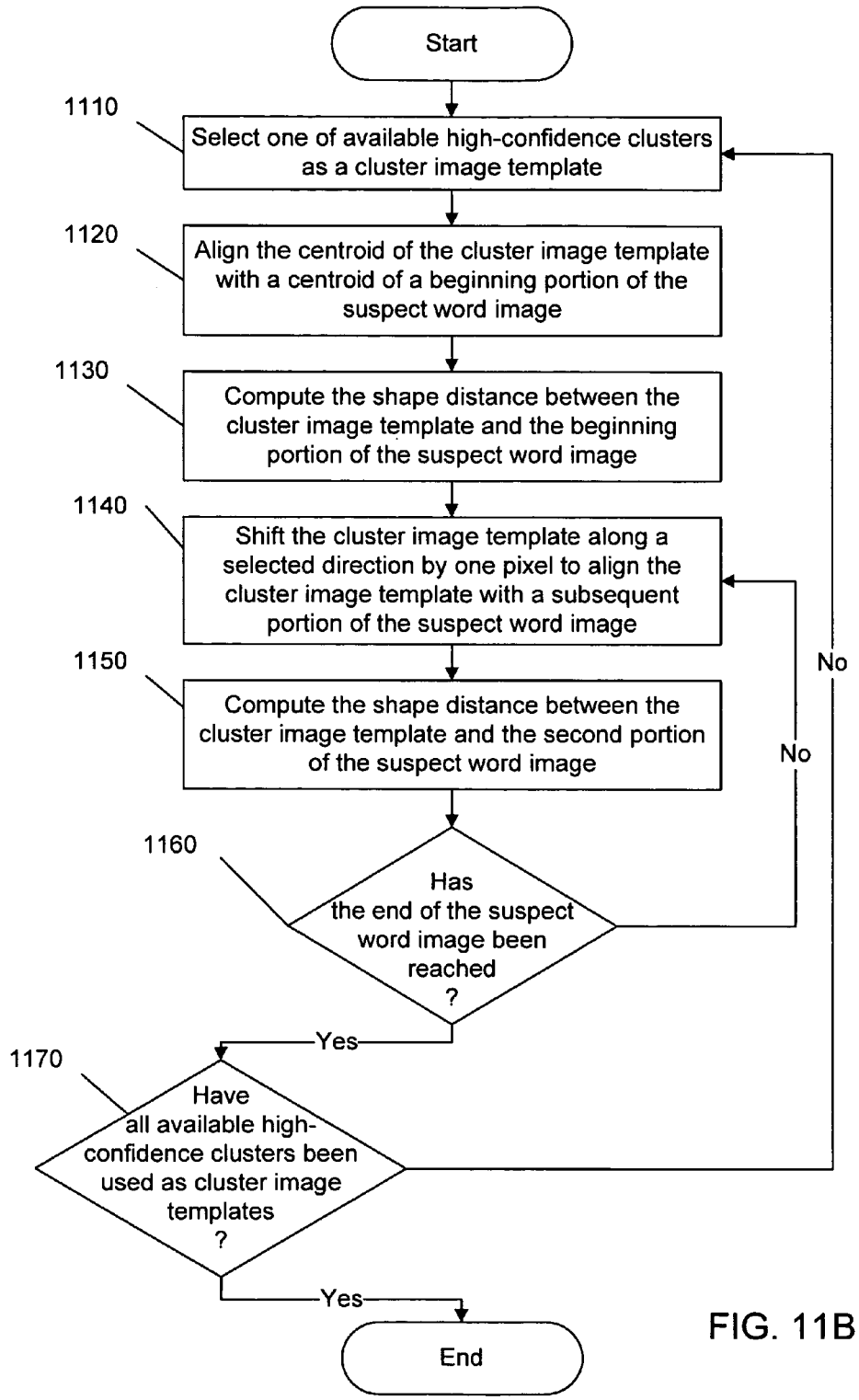

FIGS. 11A and 11B show operation details of the sliding window process 1010 in FIG. 10. FIG. 11A shows the sliding window process 1010 using a cluster image template 1100 selected from a cluster image with a high confidence score to align with different portions of the suspect word image 1001. For example, the cluster image template 1100 is placed at a series of different positions that are shifted by one pixel between two adjacent positions along the sliding direction to overlap with the suspect word image 1001. FIG. 11B shows an example processing operation. First, the cluster image template 1100 is selected from the available cluster images with high confidence scores (Step 1110). The centroid of the cluster image template 1100 and that of the beginning portion of the suspect word image 1001 are aligned (Step 1120). The shape distance between the cluster image template 1100 and the overlapped beginning portion of the suspect word image 1001 is computed (Step 1130). The cluster image template 1100 and the suspect word image 1001 are then shifted relative to each other along the sliding direction by one pixel to align the cluster image template 1100 with a subsequent portion of the suspect word image 1001 (Step 1140) and the shape distance is computed again (Step 1150). This process iterates at the different positions so that the sliding window process 1010 computes respective shape metric distances between the cluster image template 1100 and the different image portions of the suspect word image 1001 (Step 1160). The computed shape metric distances are used to determine whether an image portion of the suspect word image 1001 matches the cluster image template 1100. The above process is repeated for all selected clusters with high confidence scores (step 1170).

If there is a match, a matching portion of the suspect word image 1001 is separated and is assigned with the respective one or more OCR character codes for the matched cluster image template. This result is used in the modified OCR output 350 produced by the output processing software 340. If the one or more remaining segments of the suspect word image 1001 after the segmentation have matched cluster image templates, the respective OCR character codes are used in the modified OCR output 350. If the one or more remaining segments of the suspect word image 1001 after the segmentation do not have matched cluster image templates, these segments are marked as unidentifiable images and can be further processed by other methods (e.g., manual identification) or labeled as such in the modified OCR output 350. If there is not a single match after the sliding window process, the suspect word image 1001 is marked as an unidentifiable image and can be further processed by other methods (e.g., manual identification) or labeled as such in the modified OCR output 350.

The sliding window process 1010 shown in FIGS. 10, 11A and 11B can also be implemented as part of the cluster processing software 330 to re-segment a suspect cluster image into two or more smaller segmented cluster images. In this regard, the processing steps described in FIGS. 10, 11A and 11B are applied to a cluster image of the suspect cluster instead of the suspect word image. The segmented cluster images are further processed by cluster processing software 330 like other clusters in the clusters 320. The cluster processing software 330 selects a first cluster image of a first cluster as a cluster image template. The first cluster image has a high confidence score for the assigned one or more OCR character codes. A second cluster image from a second cluster with a low confidence score, e.g., a suspect cluster, is selected to be re-segmented by the sliding window process 1010. The cluster processing software 330 can first align the cluster image template with different image portions within the second cluster image along a predetermined direction, one portion at a time. If there is a match, a matching portion of the suspect cluster image is then used as a new third cluster image for a third cluster to be formed. The corresponding portion in each clip image in the suspect cluster image that corresponds to the cluster image template 1100 is separated from the clip image to form a new clip image. The new clip images respectively separated from the clip images in the second cluster are used to form the third cluster which is assigned one or more OCR character codes which are assigned to the cluster image template 1100. The remainders of clip images of the suspect cluster image after separation of the new clip images for the third cluster are used to form at least one fourth cluster. If the location of the matched portion is in the middle of the suspect cluster image to split the suspect cluster image into three segments, the remainders of the clip images of the suspect cluster image can form two different new clusters. The newly segmented clusters are then used to replace the second cluster in producing the modified OCR output 350.

Suspect clusters may also be processed by incorporating manual identification and correction in an automated way at the cluster level to exploit the high accuracy of the manual correction. The clustering techniques described in this specification can be implemented to mitigate the high cost and laborious process of many other manual OCR correction techniques.

Figure 12:
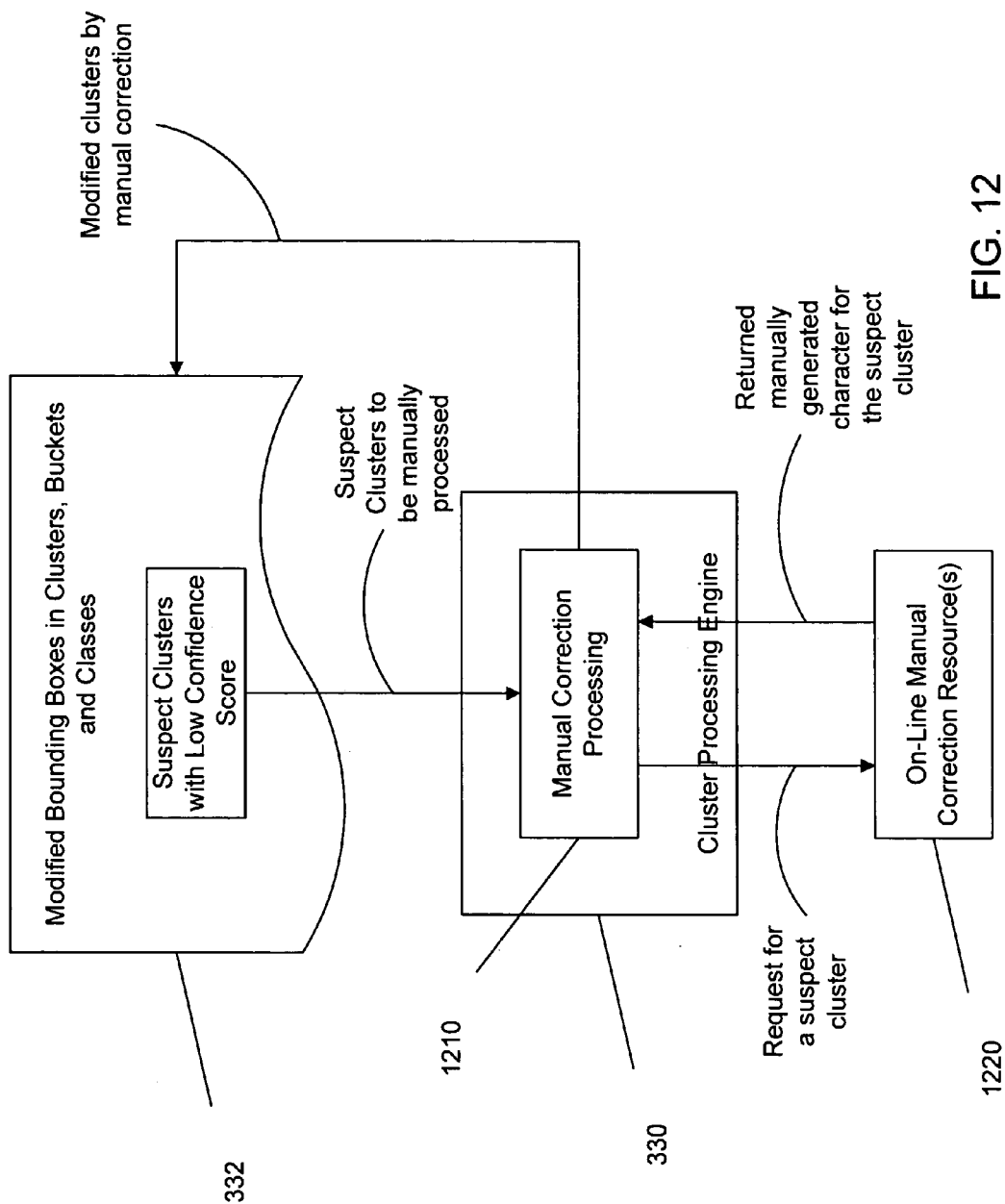
FIG. 12 illustrates one implementation of automated manual correction where a manual correction process can be included as part of the cluster processing software in FIG. 3.

FIG. 12 illustrates one implementation of automated manual correction where a manual correction process 1210 can be included as part of the cluster processing software 330 in FIG. 3. In operation, the cluster processing software 330 selects a cluster image of a cluster, e.g., a suspect cluster, to solicit manual identification and uses the manual identification to generate one or more new OCR character codes for the selected cluster.

The request for manual identification may be sent to one or more on-line manual correction resources 1220. An on-line manual correction resource 1220 can be an on-line computer through which an operator views a requested suspect cluster image and the assigned OCR character and sends back either a confirmation of the associated text for the cluster image or a new corrected text for the cluster image. A single request can include images for multiple suspect clusters. The manual correction process 1210 uses the response from the on-line manual correction resource 1220 to update the cluster in the modified clusters 332. For example, the manual correction process 1210 can replace the one or more existing OCR character codes for the suspect cluster with one or more new OCR character codes generated based on the returned response from the on-line manual correction resource 1220. For each manually corrected or confirmed cluster, the cluster processing software 330 changes the cluster from a suspect cluster to an acceptable cluster and assigns a high confidence score to the cluster for use in subsequent post-OCR processing. This allows the modified clusters 332 to be updated with the manual correction result by the cluster processing software 330.

Alternatively, the automated manual correction may be implemented by using on-line resources without designated persons or operators for the manual correction. The on-line manual correction resource may be designed as part of an on-line game or service where a manual input by a user is needed for the on-line game or service.

For example, the cluster image of a suspect cluster may be used as an image for an on-line game which requires a player to identify the image. The ESP game at http://www.espgame.org/ is one example for such an on-line game where a player is presented with an image and the player is requested to enter the name of an object shown in the image. The name, e.g., the character code, entered by the player is used, on one hand, as part of the on-line game and, on the other hand, is simultaneously used as a manual identification of the suspect cluster image for the post-OCR processing.

For another example, various web sites use a challenge-response test such as the CAPTCHA ("Completely Automated Public Turing test to tell Computers and Humans Apart") images as part of a log-in process to determine whether or not the user of the web site is a human being. The image of a suspect cluster can be used as a CAPTCHA or a part of a CAPTCHA. Hence, a CAPTCHA with a distorted text may be attached with an image of a suspect cluster at the end. A user attempting to gain access to the service would both solve the CAPTCHA and give the best guess as to what the one or more characters represented by the suspect cluster image at the end of the CAPTCHA might be. The user identified characters are received and are used to verify or correct one or more particular characters assigned to the suspect cluster image by the OCR process. To improve the accuracy of the user identification via the CAPTCHA, the same cluster image of the suspect cluster may be sent in different CAPTCHAs to different users to provide a redundancy check on the returned responses for the cluster image where a consistent answer to the same cluster image from different users is a strong indication that returned response is reliable. Hence, in one implementation, a user identification of the averaged image of the particular cluster is obtained from each of multiple different users based on the on-line challenge-response test. A particular user identification of the averaged image of the particular cluster is validated using obtained user identifications from other users of the multiple different users. The validated user identification is then used to verify or correct one or more particular characters assigned to the particular cluster by the OCR process.

A cluster image generated by an OCR engine may be a nonsensical image that does not represent any characters. This may be caused in different ways. For example, improper segmentation by the OCR engine can produce a part of a character in a clip image or a character in combination with a part of another character in a clip image. For another example, the original document images fed into the OCR engine may have a nonsensical mark in a clip image. When a nonsensical cluster image is classified as a suspect cluster image for manual identification in any one of the above automated manual correction techniques, the person who views the nonsensical suspect cluster image can respond with a message stating that the image is nonsensical or the image is not a single or more whole characters. The manual correction processing 1210 can be configured to handle this situation by retaining the suspect status of such a cluster and flagging the nature of this cluster. For example, automatic re-segmentation can be applied to incorrectly segmented characters and the results can be fed back to the manual verification process, repeatedly if necessary, until a satisfactory segmentation is obtained.

The post-OCR systems shown in FIG. 12 and its variations can be implemented in one or more computer servers in a communication network. The one or more computer servers can be used to provide the OCR engine and the post-OCR engine. A client computer in the network can send the document image to the one or more computer servers to request for an OCR output of the document. The OCR engine and the post-OCR engine process the client's document image and produce the OCR output which can be sent to the client computer through the communication network. One or more on-line servers can be connected to the communication network and to supply on-line manual correction resources for use by the post-OCR engine. The post-OCR engine is operable to select a cluster which has a low level of confidence to obtain a manual assignment of one or more characters with the cluster image of the selected cluster. In this regard, a request is made to the on-line server and the on-line server then generates the manual assignment for the selected cluster image. The on-line server can be, for example, a computer that supplies a challenge-response test to users at user computers accessing a web site hosted by the on-line server, or a computer that hosts the ESP game or other games that solicit responses from on-line users.

One of the applications for the post-OCR processing techniques described in this specification is post-OCR processing in an OCR system with two or more OCR engines. This use of two or more OCR engines can further exploit benefits of redundancy in OCR processing and to improve the OCR accuracy. Such a system can be implemented in various configurations.

Figure 13:
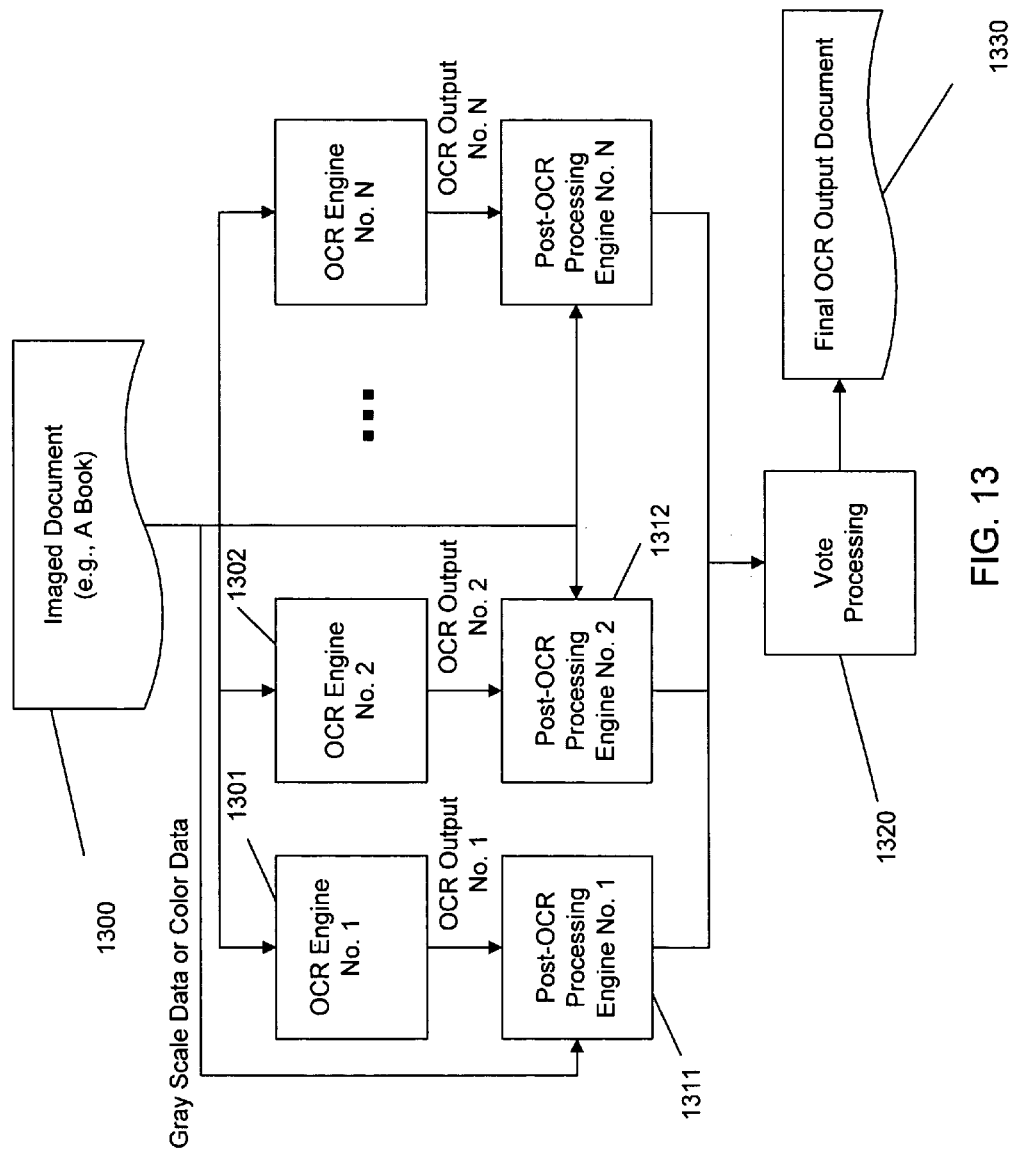
FIG. 13 shows an example OCR system that includes two or more OCR engines and post-OCR processing engines in a voting configuration.

FIG. 13 shows an example OCR system that includes two or more OCR engines 1301, 1302 and post-OCR processing engines 1311, 1312 connected to operate in parallel in a voting configuration. Each OCR engine is paired with a post-OCR processing engine. Hence, an imaged document 1300 is independently processed by all the OCR engines in parallel. Each OCR output is then further processed by a respective post-OCR processing engine. This process produces multiple OCR outputs for the same imaged document 1300. Each post-OCR processing engine can be designed to perform part of or the entire processing functions based on the post OCR processing shown in FIG. 3. A vote processing engine 1320 is provided to receive the different OCR outputs from the post-OCR processing engines and to further process the received the different OCR outputs to produce the final OCR output 1330. The vote processing engine 1320 can apply different voting methods in producing the final OCR output 1330

In one implementation, for example, each post-OCR processing engine in FIG. 13 can perform the clustering generation 320 and produce the clip images 322 for the clusters shown in FIG. 3 without modifying the character assignment made by the respective OCR engine. The vote processing engine 1320 can choose any one of the clusters produced by the different post-OCR processing engines for the corresponding images in the final OCR output 1330. Different post-OCR processing engines can assign confidence scores to generated clusters from the post-OCR processing engines and the vote processing engine 1320 can use the confidence scores to select the cluster from a post-OCR processing engine with the highest confidence score for the final OCR output 1330. As a result, the final OCR output 1330 is generated by the vote processing engine 1320 based on a combination of the most reliable clusters from different post-OCR processing engines and can have a better OCR accuracy than that of an OCR output produced by a single pair of an OCR engine and a post-OCR processing engine.

In another implementation, each post-OCR processing engine in FIG. 13 can be configured to modify or verify the character assignment initially made by the respective OCR engine. This modification can be achieved by, e.g., applying the clustering processing 330 to produce the modified clusters 332 in FIG. 3. Each post-OCR processing engine in FIG. 13 produces a modified OCR output with improved reliability. The vote processing engine 1320 then uses the modified OCR outputs to produce the final OCR output 1330 based on the confidence scores of the clusters.

In a further implementation of the system in FIG. 13, each post-OCR processing engine (1311 or 1312) can be configured to classify clip images defined by bounding boxes in a received OCR output from the respective OCR engine (1301 or 1302) into clusters of clip images. Each cluster has clip images of similar image sizes and shapes that are assigned the same one or more particular characters by the corresponding OCR engine. Each post-OCR processing engine also produces a cluster image for each cluster, e.g., averaging clip images in each cluster to generate an averaged image as the cluster image. The vote processing engine 1320 can be configured to use shape differences between a cluster image of each cluster and cluster images of other clusters to detect whether an error exists in the one or more particular characters assigned to each cluster by the corresponding OCR engine and to correct each detected error in a particular cluster by newly assigning one or more particular characters to the particular cluster. The vote processing engine 1320 can further operate to use the newly assigned one or more particular characters for the particular cluster to replace respective one or more particular characters previously assigned by the corresponding OCR engine in a corresponding modified OCR output.

In the system in FIG. 13, two different OCR engines may segment the image differently. The vote processing engine 1320 can select the best clusters from the outputs of the post-OCR engines. Consider an example where one OCR engine improperly segments the image of a single character into two separate clip images in two adjacent bounding boxes while other OCR engines correctly identify the same image of the single character as a single clip image and place it in one bounding box. The vote processing engine 1320 can choose only one of the two alternatives based on the confidence scores and the numbers of post-OCR engines that produce the two alternatives, respectively. In the above example, the alternative cluster that includes the entire image of the single character in a single bounding box can be chosen by the vote processing engine 1320 because more OCR engines produce that alternative cluster.

Figure 14:
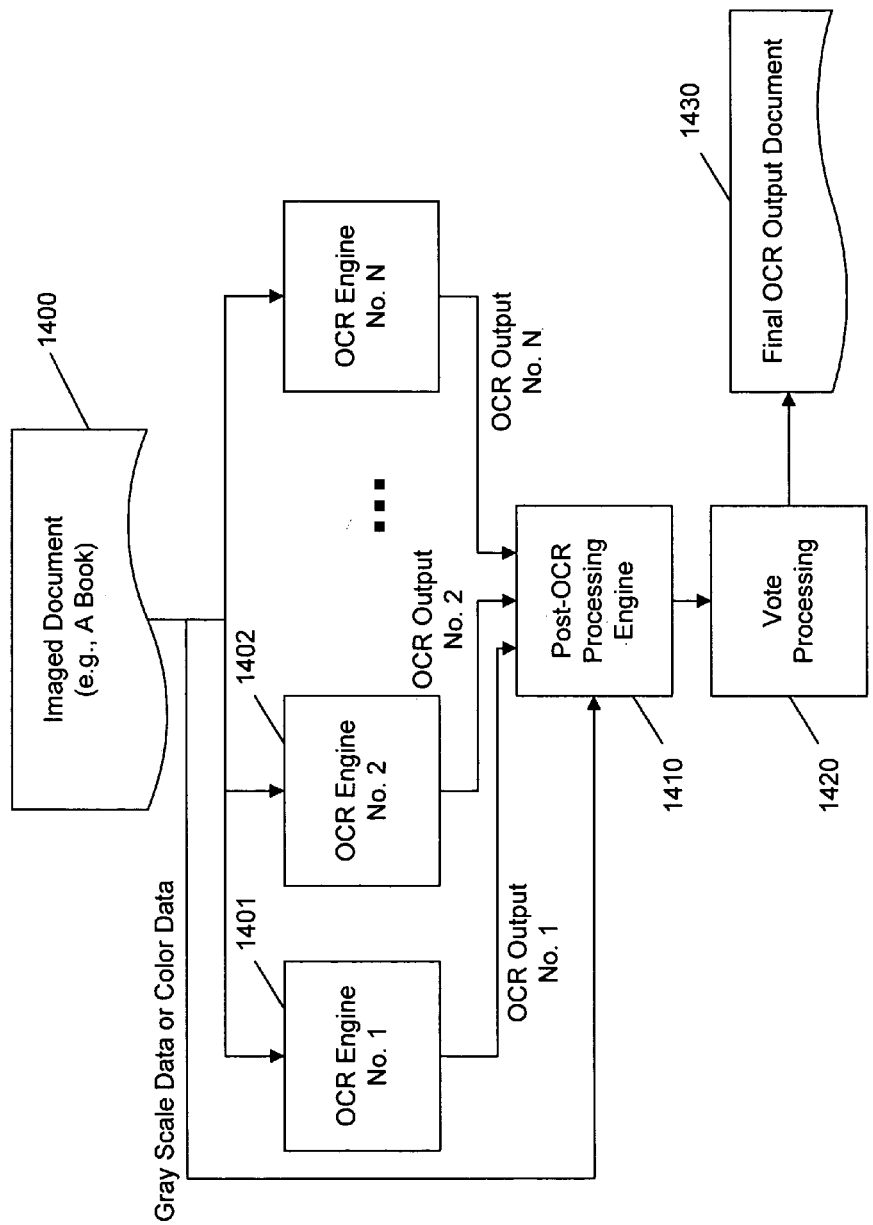
FIG. 14 shows another example OCR system that includes two or more multiple OCR engines and a single post-OCR processing engine in a voting configuration.

FIG. 14 shows another example OCR system that includes two or more multiple OCR engines 1401, 1402 and a single post-OCR processing engine 1420 in a voting configuration. The OCR engines 1401, 1402 operate independently from one another to process the original imaged document 1400 to produce their respective OCR outputs. The single post-OCR processing engine 1410 receives the OCR outputs and classify all clip images in the received OCR outputs into clusters. A cluster can include clip images from different OCR outputs and clip images in each cluster are used, e.g., by averaging the clip images, to generate a cluster image to represent the cluster. Next, cluster images are generated and shapes of different clusters are compared to verify and correct assignments of OCR character codes of the clusters. This process produces modified clusters. A vote processing engine 1420 is used to use the modified clusters to generate the final OCR output 1430.

The vote processing engine 140 can, in one implementation, processes conflicting clip images for the same image instance at a particular location in the original imaged document 1400 generated in different OCR outputs. The confidence scores for the conflicting images are compared to select the clip image with a higher confidence score to represent the image instance at the particular location.

Consider a more specific example of operations of the system in FIG. 14 with two OCR engines 1401 and 1402 for processing the original imaged document 1400 in parallel. The first OCR engine 1401 is used to process the original document image 1400 to generate first OCR output. The first OCR output includes first bounding boxes identifying first clip images located in the document image and a respective one or more characters assigned to each first clip image. The second OCR engine 1402 is used to process the document image 1400 to generate second OCR output. The second OCR output includes second bounding boxes identifying second clip images located in the document image and a respective one or more characters assigned to each second clip image. Next, the post-OCR processing engine 1410 is used to classify the first clip images and the second clip images into clusters, where each cluster includes only clip images having the same one or more characters assigned to the clip image. The post-OCR engine 1410 also generates a cluster image for each cluster by, e.g., averaging clip images in the cluster. The above generated cluster images are then used to correct the assignment of characters to clip images and determine a confidence score for each assignment of one or more characters to a clip image. The gray scale data or color data from the original document image 1400 may be retrieved and used by the post-OCR engine 1410 to improve the cluster processing. The vote processing 1420 determines whether any one of the first clip images shares a location in the document image 1400 with any one of the second clip images and the one or more characters assigned to the one first clip image are different from the one or more characters assigned to the one second clip image. If so, the vote processing 1420 uses the respective confidence scores for the one first clip image and the one second clip image to select one or more characters for the location.

The voting OCR systems shown in FIGS. 13 and 14 and their variations can be implemented in one or more computer servers in a communication network. The one or more computer servers can be used to provide the OCR engines, the one or more post-OCR engine and the vote processing engine. A client computer in the network can send the document image to the one or more computer servers to request for an OCR output of the document. The OCR engines, the one or more post-OCR engine and the vote processing engine on the one or more computer servers process the client's document image and produce the OCR output which can be sent to the client computer through the communication network.

Figure 15:
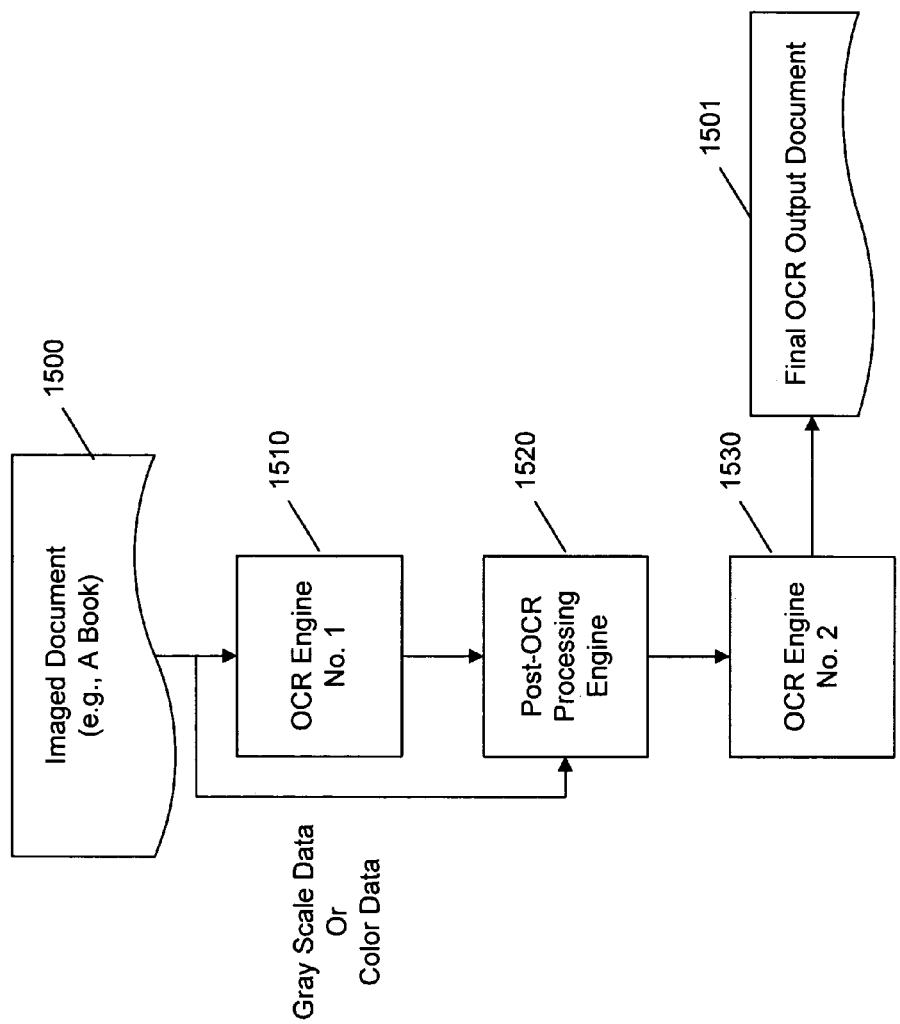
FIG. 15 shows an example OCR system that uses a first OCR engine to process the original document image and a first post-OCR processing engine to process the OCR output from the first OCR engine to produce a modified OCR output.

FIG. 15 shows an example OCR system that uses a first OCR engine 1510 to process the original document image 1500 and a first post-OCR processing engine 1520 to process the OCR output from the first OCR engine 1510 to produce a modified OCR output. The first post-OCR processing engine 1520 performs the cluster classification and clustering processing as described above on the clip images output by the first OCR engine 1510 and identifies each suspect word in form of a suspect cluster image for a cluster in which the image of the suspect word is present. A second OCR engine 1530 is then used to further process any suspect characters in the modified OCR output by verifying or correcting the assignment of one or more OCR character codes for a suspect character and to produce a final OCR output 1501. Notably, the second OCR engine 1530 can re-segment the images of the suspect clusters for further processing.

As an option, a second post-OCR engine may be used to further apply shape clustering to the output from the second OCR engine 1530 and the result of this shape clustering is used to form the final OCR output document 1501.

Post-OCR processing techniques can be used to generate high-resolution printout from low-resolution scans of a voluminous document. Some commercial OCR engines can process images with a low resolution, e.g., 200 dpi or 300 dpi (dots per inch). Such low resolution images may be inadequate for high-quality printouts. The averaged images for the clusters in the post-OCR processing techniques described in the present disclosure tend to have a higher resolution than each individual image in the scanned document due to the averaging over a large number of images in each cluster. In addition, Each clip image can be interpolated to a higher resolution clip image. This interpolation further increases the resolution of the cluster image for each cluster. Therefore, the cluster images can be used to replace each instance of an image in the scanned document with a super-resolved version of the same image in high-resolution applications such as high-resolution print-on-demand systems.

Figure 16:
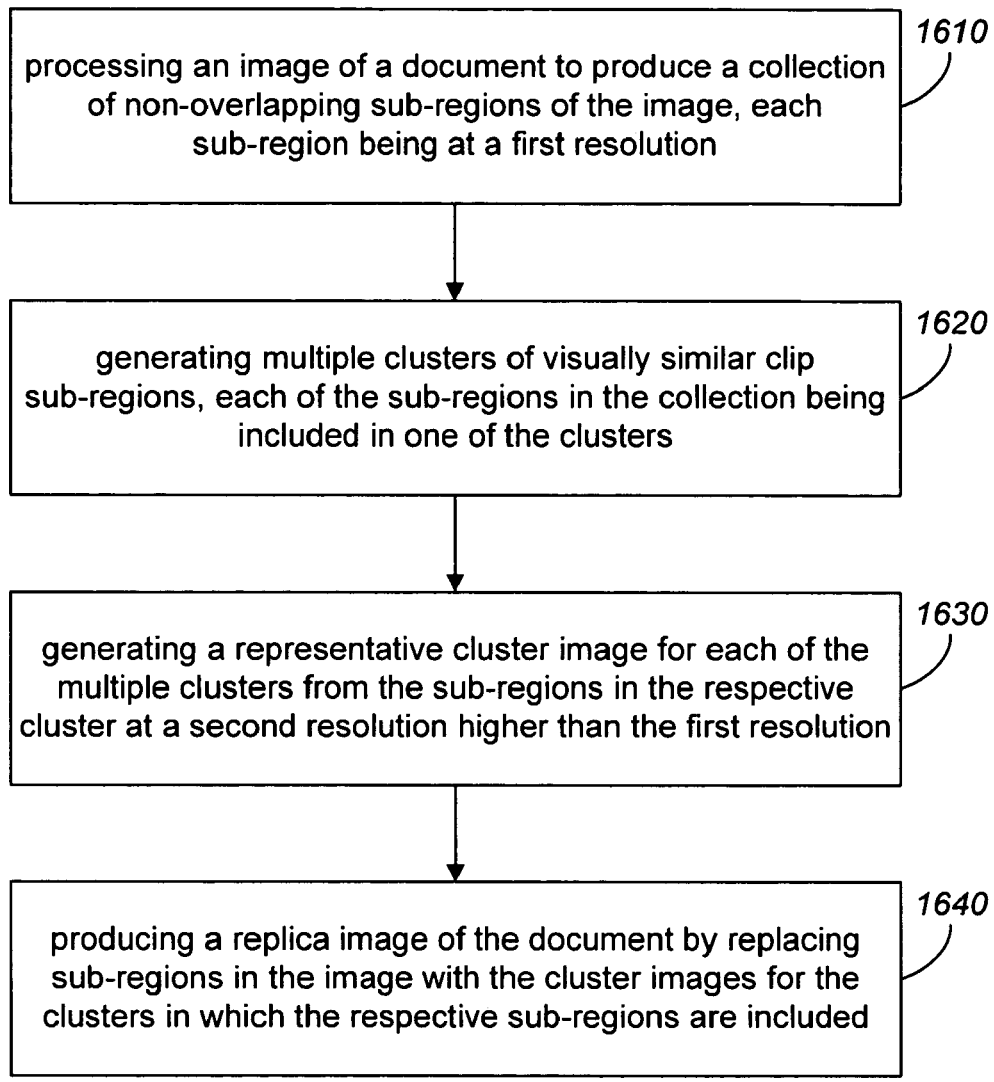
FIG. 16 illustrates one example process to produce a high-resolution version of a document.

FIG. 16 illustrates one example process to produce a high-resolution version of a document. The image of the document is first processed to produce a collection of sub regions of the image (step 1610). Each sub region is at a first resolution. The sub regions are at different locations in the image. One sub region may be completely separated from an adjacent sub region or may partially overlap with an adjacent sub region. The document can be in various formats, e.g., a collection of multiple sub documents such as articles in a common style in a book, newspaper or journal, and a multiple page document where each sub region is a portion of one page of the document. An OCR engine, for example, can be used in this process to separate the image of the document into bounding boxes as the sub regions and each bounding box has an associated clip image that is separated from the image of the document. The bounding boxes can be non-overlapping sub regions. Each sub region can include, in some implementations, color or grey scale data. The sub regions are then processed to generate multiple clusters of visually similar clip sub regions where each of the sub regions in the collection is included in one of the clusters (step 1620). This process can be achieved by shape clustering, e.g., a hierarchical agglomerative clustering algorithm which may use a k-dimension tree data structure. Each cluster can include only sub regions that are assigned the same one or more particular characters by the OCR engine and are of approximately the same size. A representative cluster image is then generated for each of the multiple clusters from the sub regions in the respective cluster at a second resolution higher than the first resolution (step 1630). Each cluster image can be generated by, e.g., interpolating each sub region in the first resolution into an interpolated sub region at the second resolution and by averaging the interpolated sub regions in each cluster. Next, the sub regions in the image are replaced with the cluster images for the clusters in which the respective sub regions are included (step 1640). This replacement produces a replica image of the document which is at the second, higher resolution. The replica image can be printed at a printer to produce a high resolution printout of the original document.

Figure 17:
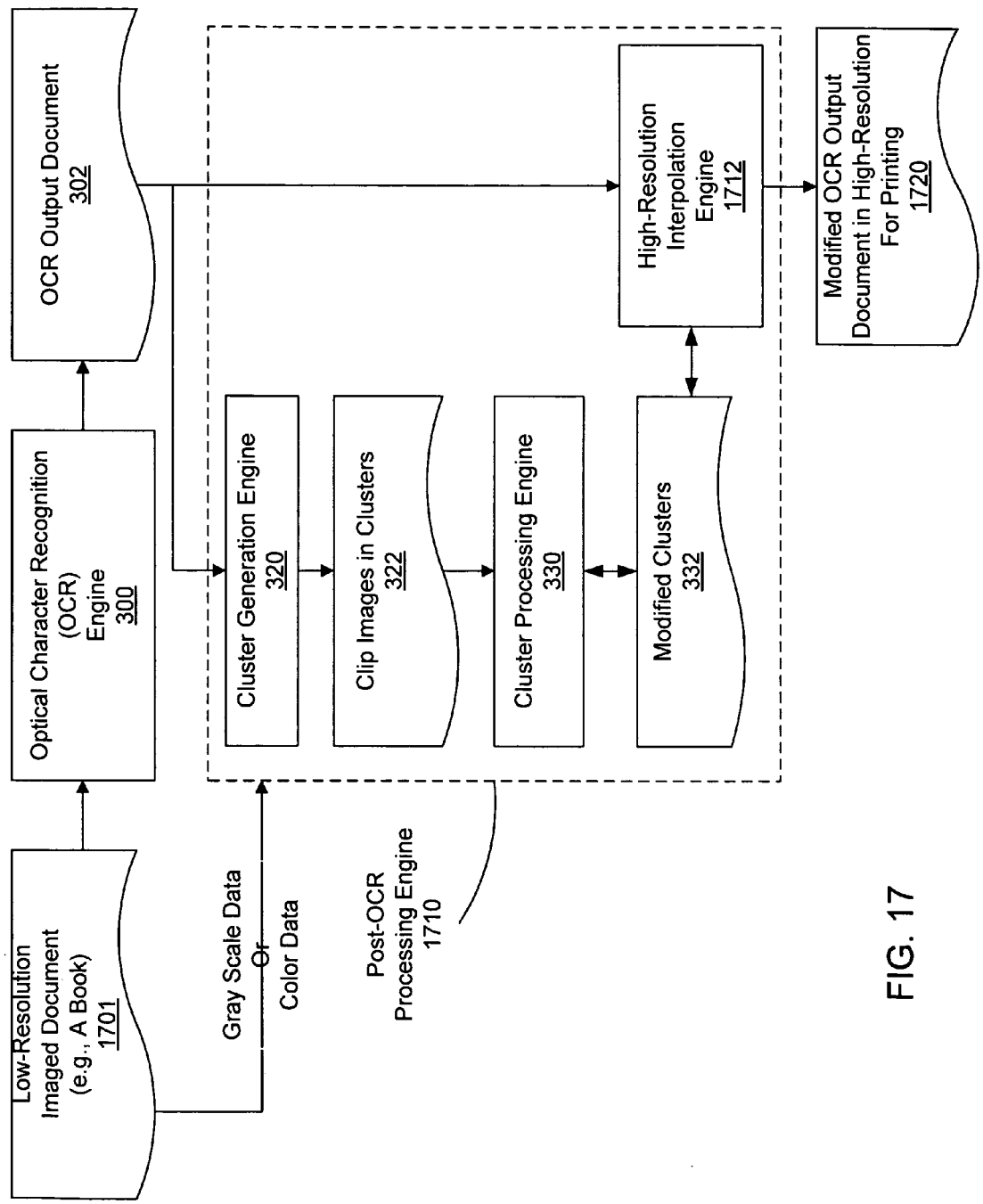
FIG. 17 illustrates an example high-resolution print-on-demand system.

FIG. 17 illustrates an example high-resolution print-on-demand system based the above process. A document is first digitized as a low resolution image 1701. An OCR engine is then used to process the image 1701 to produce an OCR output 302. A post-OCR processing engine 1710 is provided to process the OCR output 302 in a low image resolution and produce a modified OCR output document in a high resolution for printing. The engine 1710 includes the cluster generation software 320 and the cluster processing software 330 as in the post-OCR processing engine 310 of FIG. 3. Hence, clustering operations described above, such as the processes illustrated in FIGS. 2, 4, 5 and 6 and the manual identification processes, can be applied to produce the clusters 322 and the modified clusters 332. Notably, the color or gray scale data from the original document can be used in the clustering process to capture image details in the original document for rendering high-resolution cluster images. Different from the post-OCR processing engine 310 of FIG. 3, the engine 1710 includes a high-resolution interpolation engine 1712 to perform an image interpolation on each image in the imaged input document based on cluster images produced by the cluster processing software 330 to produce final images 1720 at a desired high resolution.

In one implementation, the post-OCR processing engine 1710 can operate as follows. First, the cluster generation software 320 receives and processes the OCR output 302 with a low resolution of, e.g., 200 dpi or 300 dpi to produce clusters 322. As an option, the cluster generation software 320 can be used to obtain, from the original document, color or gray scale data for clip images for bounding boxes generated by the OCR engine 300. The color or gray scale data for each clip image is then used by the cluster generation software 320 to generate the clusters 322. Next, the cluster processing software 330 process the clusters 322 to characterize or modify the clusters based on cluster shapes to produce the modified clusters 332 with improved OCR accuracy. The cluster processing software 330 can provide a manual identification process, such as cluster-level manual identification methods described above, to verify or correct assignments of OCR character codes to selected cluster images, e.g., island clusters or other suspect clusters. The sliding window processing may also be applied to one or more selected suspect clusters to segment each selected suspect cluster based on cluster images of those of the clusters 332 that have high confidence scores. After the clustering processing, the modified clusters 332 generally have improved confidence scores and enhanced OCR accuracy in comparison with the initial clusters 322. The resolution of each of the modified clusters 332 is essentially the same as that of each of the clusters 322.

Next, the high-resolution interpolation engine 1712 applies an image interpolation algorithm to each clip image in each cluster and produces a high-resolution clip image for each clip image. Various interpolation algorithms can be used, including bilinear interpolation algorithms. As a result, all clip images are transformed into a resolution that is higher than the resolution before the interpolation. As an example, a 300-dpi clip image may be interpolated to a 1200-dpi clip image. For each cluster, the centroids of the interpolated clip images are computed and the interpolated clip images are aligned at their centroids. The aligned interpolated clip images for each cluster are averaged to produce an averaged image as the cluster image. Because of the interpolation of each clip image and the averaging operation, this cluster image has a higher resolution than the cluster image without the interpolation. The high-resolution interpolation engine 1712 then uses each high-resolution cluster image to replace all image instances in that cluster in the imaged input document to produce the high-resolution document 1720 as a replica of the image of the input document. This replica 1720 can be sent to a printer to print the document in the high interpolated resolution.

The system shown in FIG. 17 can be implemented in one or more computer servers in a communication network. A client computer in the network can send the low-resolution document image to the one or more computer servers to request for a high-resolution replica of the document image. The OCR engine and the post-OCR engine on the one or more computer servers process the client's document image and produce the high-resolution replica. The high-resolution replica can be sent to the client computer through the communication network or be printed at a printer connected to the communication network.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

A c system for implementing the disclosed embodiments can include client computers (clients) and server computers (servers). A client and a server are generally remote from each other and typically interact through a communication network. The relationship of client and server can arise by virtue of computer programs running on the respective computers and having a client-server relationship to each other.

Figure 18:
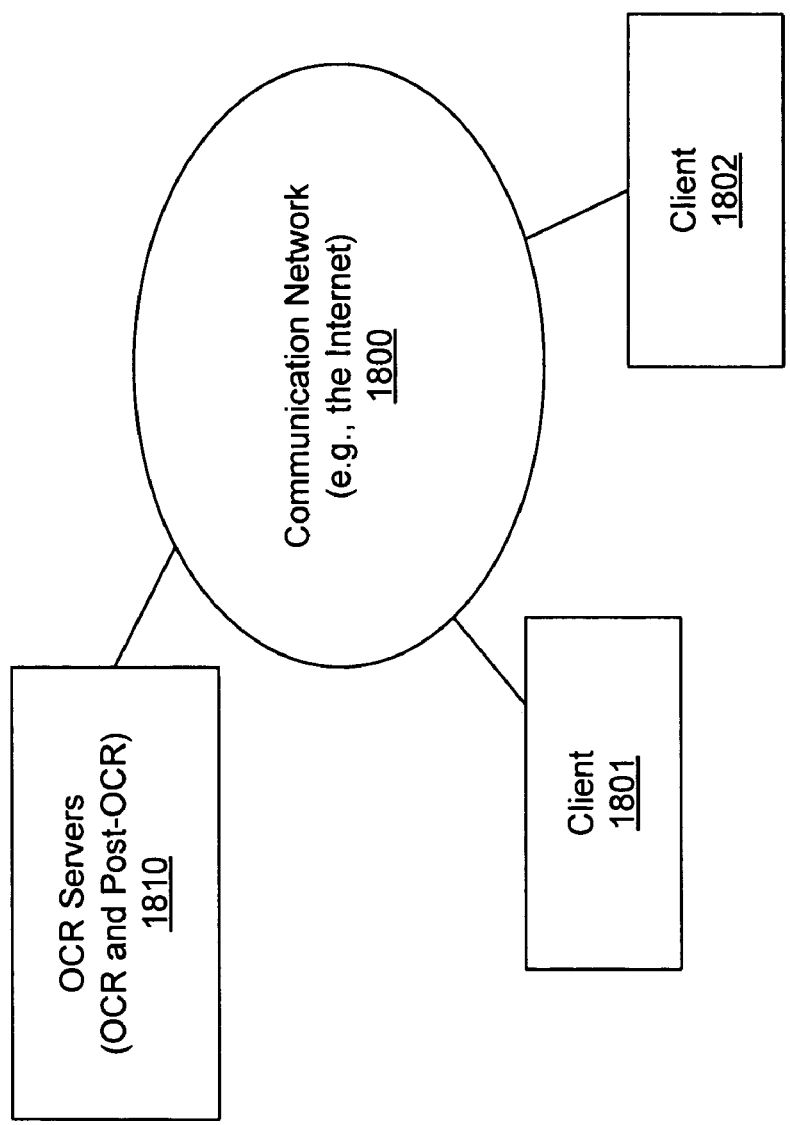
FIG. 18 shows an example computer system that implements OCR and post-OCR processing.

FIG. 18 shows an example computer system that implements OCR and post-OCR processing. This system includes a communication network 1800 that enables communications for communication devices connected to the network 1800, such as computers. For example, the communication network 1800 can be a single computer network such as a computer network within an enterprise or a network of interconnected computer networks such as the Internet. One or more OCR servers 1810 are connected to the communication network 1800 and provide (1) one or more OCR engines for OCR processing and (2) one or more post-OCR processing engines for the post-OCR processing described in this specification. The one or more OCR engines for OCR processing may also be placed on different computer servers from one or more computer servers that provide the one or more post-OCR processing engines. In operation, one or more client computers (e.g., clients 1801 and 1802) can use the communication network 1800 to remotely access the OCR server 1810 for OCR services. The client 1801, for example, can send a request to the OCR server 1810 for OCR processing of an imaged document. The client 1801 sends the imaged document to the OCR server 1810. After receiving the imaged document, the OCR server 1801 directs the imaged document to one or more OCR engines for OCR processing. The OCR output from an OCR engine is then sent to a post-OCR processing engine for further processing to produce a modified OCR output. The OCR server 1810 then sends the modified OCR output to the client 1801. The high-resolution printing described in FIGS. 16 and 17 can also be implemented in the system in FIG. 18.

Figure 19:
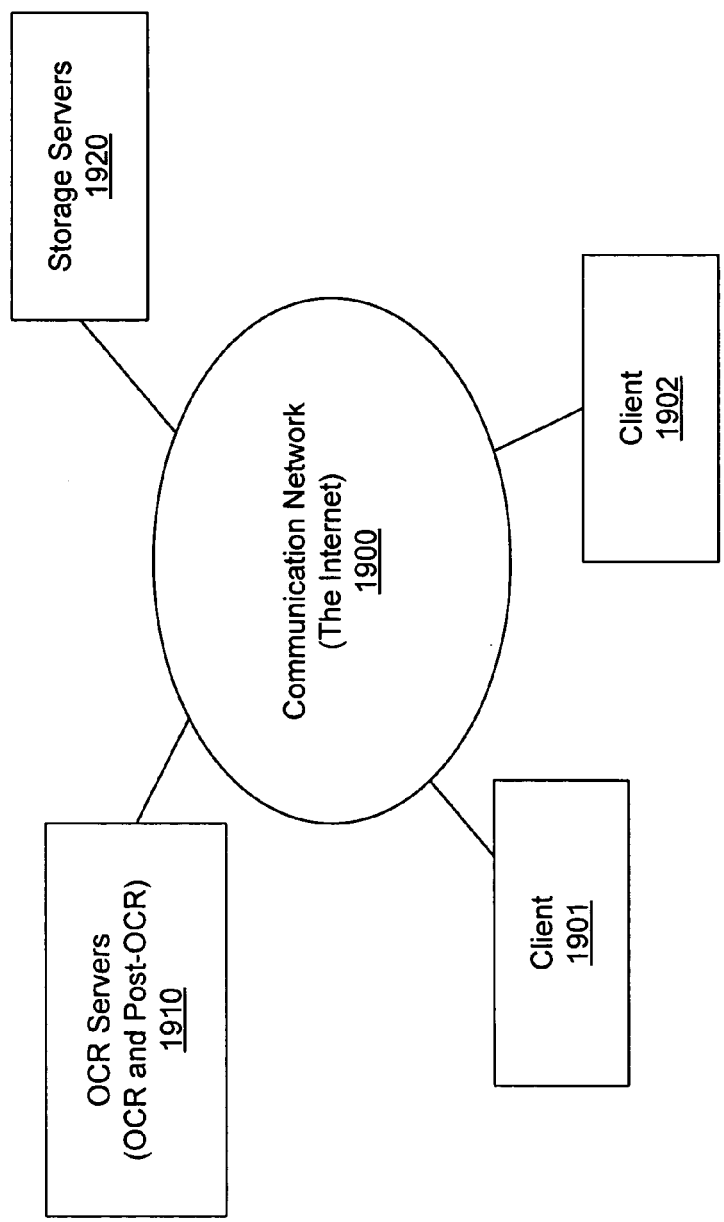
FIG. 19 shows an example computer system that provides an on-line OCR service based on OCR and post-OCR processing.

FIG. 19 shows an example computer system that provides an on-line OCR service based on the above described OCR and post-OCR processing. This system uses one or more OCR storage servers 1920 to store a searchable library of OCR outputs for selected document images, e.g., selected books and articles. A user can access the OCR storage servers 1920 to search for and retrieve the OCR text document for a particular document of interest. The system includes a communication network 1900 that enables communications for communication devices connected to the network 1900, such as computers. For example, the communication network 1900 can be a single computer network such as a computer network within an enterprise or a network of interconnected computer networks such as the Internet. One or more OCR servers 1910 are connected to the communication network 1900 and provide (1) one or more OCR engines for OCR processing and (2) one or more post-OCR processing engines for the post-OCR processing described in this specification. The one or more OCR engines for OCR processing may also be placed on different computer servers from one or more computer servers that provide the one or more post-OCR processing engines. Also connected to the communication network 1900 are the one or more OCR storage servers 1920 that store searchable pre-processed OCR outputs by the OCR processing and post-OCR processing on the OCR servers 1910. A system management control is provided in the system in FIG. 19 to control the OCR and post-OCR processing on the OCR servers 1910 to provide OCR outputs to the OCR storage servers 1920. The pre-processed OCR outputs in the OCR storage servers 1920 are indexed and cataloged for search and retrieval. As new OCR outputs for selected documents are received from the OCR servers 1910, the database in the OCR storage servers 1920 is updated. In operation, one or more client computers (e.g., clients 1901 and 1902) can use the communication network 1900 to remotely search or access the OCR storage servers 1920 to retrieve a desired OCR output. The client 1901, for example, can send a request to the storage servers 1920 for OCR output of an imaged document or can access the storage servers 1920 to search the database for the OCR output of the imaged document. If, the requested OCR output exists in the storage servers 1920, the servers 1920 then send the OCR output to the client 1901. Otherwise, the client 1901 is notified that the requested OCR output is not currently available. The servers 1920 can keep records of the OCR requests and the system management control can, based on he request records, control the OCR and post-OCR processing to process selected new document images that are requested for OCR service by users but their OCR outputs are not stored on the servers 1920. The high-resolution printing described in FIGS. 16 and 17 can also be implemented in the system in FIG. 19.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method, comprising:
processing an image of a document to produce a collection of non-overlapping sub-regions of the image, each sub-region being at a first resolution;
generating multiple clusters of visually similar clip sub-regions, each of the sub-regions in the collection being included in one of the clusters;
generating a representative cluster image for each of the multiple clusters from the sub-regions in the respective cluster at a second resolution higher than the first resolution; and
producing a replica image of the document by replacing sub-regions in the image with the representative cluster images for the clusters in which the respective sub-regions are included, wherein the method is performed by one or more computer processors.

2. The method of claim 1, wherein:
the document is a multiple page document; and
each sub-region is a portion of one page of the document.

3. The method of claim 2, wherein:
each original sub-region is defined by a rectangular bounding box.

4. The method of claim 1, wherein:
the document includes a plurality of different sub documents.

5. The method of claim 4, wherein:
the plurality of different sub documents are printed in a common style.

6. The method of claim 5, wherein:
the plurality of different sub documents are articles in a book or journal.

7. The method of claim 1, wherein:
the sub-regions of the image include gray scale or color data; and
using the gray scale or color data to generate the representative cluster images of the second resolution.

8. The method of claim 1, wherein:
the sub-regions of the image include gray scale or color data and the representative images generated from the clusters are binary images.

9. The method of claim 1, further comprising:
generating the multiple clusters of visually similar sub-regions by applying a hierarchically agglomerative clustering algorithm to the collection of sub-regions.

10. The method of claim 1, further comprising:
using an optical character recognition (OCR) engine to process the image at the first resolution to identify the sub-regions and to assign one or more characters to each sub-region; and
generating the multiple clusters of visually similar sub-regions by assigning the sub-regions to the multiple clusters of sub-regions so that each cluster includes only sub-regions that are assigned the same one or more particular characters by the OCR engine and that are of approximately the same size.

11. The method of claim 1, further comprising:
printing the replica image.

12. The method of claim 1, further comprising:
using gray scale or color information in the image of the document to generate an averaged image for each cluster at the second resolution.

13. The method of claim 1, wherein generating an averaged image further comprises:
obtaining gray scale or color information for each sub-region in a respective cluster;
using the gray scale or color information to obtain a centroid position of each sub-region;
overlapping centroid positions of the sub-regions within the cluster; and
using the overlapped sub-regions in the cluster to obtain the averaged image.

14. The method of claim 1, further comprising:
performing an interpolation in averaging the sub-regions in each cluster to obtain a corresponding averaged image.

15. The method of claim 14, wherein:
a bilinear interpolation algorithm is applied to the interpolation.

16. A computer program product, encoded on a computer-readable medium, operable to cause data processing apparatus to perform operations comprising:
processing an image of a document to produce a collection of non-overlapping sub-regions of the image, each sub-region being at a first resolution;
generating multiple clusters of visually similar clip sub-regions, each of the sub-regions in the collection being included in one of the clusters;
generating a representative cluster image for each of the multiple clusters from the sub-regions in the respective cluster at a second resolution higher than the first resolution; and
producing a replica image of the document by replacing sub-regions in the image with the representative cluster images for the clusters in which the respective sub-regions are included.

17. A method, comprising:
applying an optical character recognition (OCR) process to an original image of a document to produce clip images at different locations of the original image, each clip image being at a first resolution;
classifying the clip images into a plurality of clusters of clip images, each cluster including clip images that are assigned the same one or more characters codes by the OCR process and are identical or similar in size;
transforming each clip image in each cluster into a transformed clip image at a second resolution higher than the first resolution;
averaging transformed clip images in each cluster to generate a cluster image; and
using cluster images of the plurality of clusters to replace corresponding clip images initially produced by the OCR process to generate a replica of the original image of the document at the second resolution.

18. The method of claim 17, further comprising:
applying an interpolation algorithm to each clip image in each cluster to produce a respective transformed clip image.

19. The method of claim 18, wherein:
the interpolation algorithm is a bilinear interpolation algorithm.

20. The method of claim 17, further comprising:
using gray scale or color data in the original image of the document to form the clip images in each cluster.

21. The method of claim 17, further comprising:
printing the replica at the second resolution.

22. The method of claim 17, further comprising:
obtaining a centroid position of each transformed clip image in each cluster;

overlapping centroid positions of transformed clip images within the cluster; and averaging the overlapped transformed clip images in the cluster to obtain the cluster image.

23. The method of claim 17, wherein:

each clip image is defined by a bounding box in the received OCR output, and the clusters include (1) clusters in which each clip image is associated with a single bounding box produced by the OCR engine and (2) clusters in which each clip image is associated with two or more adjacent bounding boxes produced by the OCR engine.

24. A computer program product, encoded on a computer-readable medium, operable to cause data processing apparatus to perform operations comprising:

applying an optical character recognition (OCR) process to an original image of a document to produce clip images at different locations of the original image, each clip image being at a first resolution;

classifying the clip images into a plurality of clusters of clip images, each cluster including clip images that are assigned the same one or more characters codes by the OCR process and are identical or similar in size;

transforming each clip image in each cluster into a transformed clip image at a second resolution higher than the first resolution;

averaging transformed clip images in each cluster to generate a cluster image; and using cluster images of the plurality of clusters to replace corresponding clip images initially produced by the OCR process to generate a replica of the original image of the document at the second resolution.

25. A system, comprising:

an optical character recognition (OCR) engine operable to process an original image of a document to produce an OCR output which includes clip images at different locations of the original image, each clip image being at a first resolution; and a post-OCR engine in communication with the OCR engine to receive the OCR output, wherein the post-OCR engine is operable to:

classify the clip images into a plurality of clusters of clip images, each cluster including clip images that are assigned the same one or more characters codes by the OCR engine and are identical or similar in size;

transform each clip image in each cluster into a transformed clip image at a second resolution higher than the first resolution;

average transformed clip images in each cluster to generate a cluster image; and use cluster images of the plurality of clusters to replace corresponding clip images initially produced by the OCR engine to generate a replica of the original image of the document at the second resolution.

26. The system of claim 25, further comprising:

one or more server computers that comprise the OCR engine and the post-OCR engine; and a communication network with which the one or more computer servers are in communication, the communication network operable to direct the original image of the document from a client computer to the OCR engine.

27. The system of claim 25, wherein:

the OCR engine and the post-OCR engine are on different server computers.

28. The system of claim 25, further comprising:

one or more server computers that comprise the OCR engine and the post-OCR engine;

a communication network with which the one or more computer servers are in communication; and one or more storage server computers that are in communication with the communication network and store replicas of selected original images at the second resolution produced by the OCR engine and the post-OCR engine, wherein the communication network provides communications between a client computer and the one or more storage server computers to allow the client computer to retrieve from the one or more storage server computers an existing replica at the second resolution for an original image produced by the OCR engine and the post-OCR engine.

29. The system of claim 25, further comprising:

a printer connected to the communication network to print the replica produced by the post-OCR engine.

* * * * *

UNITED STATES PATENT AND TRADEMARK OFFICE
CERTIFICATE OF CORRECTION

PATENT NO. : 7,646,921 B2
APPLICATION NO. : 11/519320
DATED : January 12, 2010
INVENTOR(S) : Vincent et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 779 days.

Signed and Sealed this

Twenty-eighth Day of December, 2010

David J. Kappos
*Director of the United States Patent and Trademark Office*